(12) United States Patent
Arrakoski et al.

(10) Patent No.: US 7,653,030 B2
(45) Date of Patent: Jan. 26, 2010

(54) GENERATION BROADBAND WIRELESS INTERNET, AND ASSOCIATED METHOD, THEREFOR

(75) Inventors: Jori Arrakoski, Espoo (FI); Nico van Waes, San Jose, CA (US); Ari Leppä, Espoo (FI)

(73) Assignee: Nokia Corporation, Espoo (FI)

( * ) Notice: Subject to any disclaimer, the term of this patent is extended or adjusted under 35 U.S.C. 154(b) by 1149 days.

(21) Appl. No.: 09/833,868

(22) Filed: Apr. 12, 2001

(65) Prior Publication Data

US 2002/0027894 A1    Mar. 7, 2002

Related U.S. Application Data

(60) Provisional application No. 60/196,632, filed on Apr. 12, 2000.

(51) Int. Cl.
    *H04W 4/00* (2009.01)
(52) U.S. Cl. .................................. 370/338; 370/254
(58) Field of Classification Search .............. 370/254, 370/256, 328, 338, 401, 406, 408
    See application file for complete search history.

(56) References Cited

U.S. PATENT DOCUMENTS

| | | | | |
|---|---|---|---|---|
| 5,761,195 A | * | 6/1998 | Lu et al. ................. | 370/329 |
| 6,137,802 A | * | 10/2000 | Jones et al. ............. | 370/401 |
| 6,219,346 B1 | * | 4/2001 | Maxemchuk ............. | 370/338 |
| 6,304,556 B1 | * | 10/2001 | Haas ...................... | 370/254 |
| 6,349,091 B1 | * | 2/2002 | Li ........................... | 370/238 |
| 6,418,138 B1 | * | 7/2002 | Cerf et al. ............... | 370/352 |
| 6,456,600 B1 | * | 9/2002 | Rochberger et al. ..... | 370/255 |
| 6,751,455 B1 | * | 6/2004 | Acampora ............... | 455/414.1 |
| 6,980,537 B1 | * | 12/2005 | Liu ........................ | 370/338 |

FOREIGN PATENT DOCUMENTS

WO    WO 01/24453    4/2001

OTHER PUBLICATIONS

U.S. Appl. No. 60/164,941.*
U.S. Appl. No. 60/164,942.*
U.S. Appl. No. 60/164,955.*
U.S. Appl. No. 10/089,326 (not published).

* cited by examiner

*Primary Examiner*—Robert W Wilson
(74) *Attorney, Agent, or Firm*—Mintz, Levin, Cohn, Ferris, Glovsky and Popeo, P.C.

(57) ABSTRACT

A wireless access network, and an associated method, is formed of multiple tiers to provide for communications between individual nodes. Each tier of the network operates at different frequency ranges and provides for connectivity between selected nodes of the different tiers.

20 Claims, 25 Drawing Sheets

Network concept

Square Grid

Ad-hoc Mesh network with 25 customers (all within 5 hops)

Ad-hoc Mesh network with 50 customers (all within 7 hops)

Ad-hoc Mesh network with 100 customers (all within 5 hops)

Ad-hoc Mesh network with 200 customers (all within 5 hops)

Mesh network applied in rural case

ISM band spectrum allocation

MMDS bandwidth allocation (USA example)

LMDS bandwidth allocation (USA example)

IEEE 802.11 Spectral masks: OFDM (11a) and DSSS (11 and 11b)

Hyper-, Super- and Frame structure

Neighborhood definitions

Data slot Reservation example

PMT Tier with 90° sectors at the sink (S)

Multi-cast scheduling (black denotes empty slot)

Traffic matrix for network in Figure 17 (black denotes slot available for simultaneous transmission)

Mesh network based on PTP connections

Traffic matrix for network in Figure 20 (black denotes slot available for simultaneous transmission)

PMT control slot & channel allocation example for network in Figure 17 (assuming narrowbeam antennas at nodes).

A PMT network with two sinks

PMT control slot & channel allocation example for network in Figure 17 (assuming narrowbeam antennas at nodes).

GENERATION BROADBAND WIRELESS INTERNET, AND ASSOCIATED METHOD, THEREFOR

CROSS-REFERENCE TO RELATED APPLICATIONS

The present invention claims the priority of provisional patent application Ser. No. 60/196,632 filed on Apr. 12, 2000, the contents of which are incorporated by reference herein.

FIELD OF THE INVENTION

The present invention relates to communications networks and, more specifically, to scalable multi-tiered mesh networks.

BACKGROUND OF THE INVENTION

The invention described in this document provides the system concept of a multi-tiered integrated wireless access network. The innovation includes the design of each tier to "fit seamlessly" in the multi-tiered architecture. In comparison, previous-disclosed networks typically consist of one tier only, which neither provide scalability nor are designed with lower or higher wireless network tiers in mind.

Fitting seamlessly, as mentioned above, is defined in terms of connectivity and interference avoidance. Within the described network, each tier operates in a different frequency band, hence achieving total interference avoidance, but prohibiting interoperability.

For network tiers outside the scope of this invention, which may be attached on top or below the described network for example WLAN (Wireless Local Area Networks) or PAN (Personal Access Networks), and which may operate within the same frequency band, CCA (Carrier Controlled Access) will be employed to allow for graceful coexistence. Devices meant for operation in the Ad-hoc Mesh Tier will be capable of interoperability with WLAN's. That is, these devices will be able to switch operation from one tier into the other.

Connectivity in the above sense is defined as the possibility to connect co-located devices from different tiers back to back. Interoperability is defined as the capability of a device made to function in one tier in a certain mode and to function in another tier in that same mode.

The notion of a multi-tiered architecture is relevant due to the fact that it provides flexible and scalable network deployment, which provides high cost efficiency especially in the mesh architecture of the lowest tier. Thus, increasing the throughput can easily be achieved by inserting only a new node into the tier above, without manual reconfiguration of any other devices. This compared to a one-tier approach, where increasing bandwidth demand often can only be met by a total reconfiguration of the whole (sub)-network.

This flexibility and scalability allows the network operator the unique ability to start the network small, extending it as demand increases, whereas other networks generally need to be fully pre-deployed (wired networks), or pre-deployed to a large extent to avoid the huge cost of network extension (one-tier wireless approaches).

The notion of a multi-tiered architecture is also relevant due to the fact that it avoids the trade-off between technology cost and performance demands. For a one-tiered network, for example a network in the LMDS band, the throughput can be made adequate throughout the network, but the cost of a CPE is high due to the high cost of RF-technology in this band. For a one-tiered network in the 2.4 GHz band for example, the CPE cost is comparatively much lower, however, the achievable throughput, with current state of the art technology, is lacking. The multi-tiered approach disclosed in this document provides the best of both of the above, while avoiding their drawbacks.

The physical layer of the Ad-hoc Mesh Tier (AMT) is based on existing WLAN standards, such as the IEEE 802.11 standard, or a variant thereof. This technology is not sufficient enough to handle all the cases in the outdoor environment. Improvements are therefore mandatory. The added features will among others aid in extending the range and improving the interference and error resilience, thereby increasing the system capacity.

Since the physical layer of the AMT has similar RF (radio frequency) characteristics as WLAN, interoperability can be achieved purely by additional software and is therefor not excluded. For example, if the device also has an indoor antenna, it could additionally serve as WLAN base-station on a time-sharing basis.

Comparing the proposed solution with WLAN on the link/network layer level, the proposed solution is superior in that it does not use the concept of base-stations (master/slave approach), which results in higher flexibility and failure resistance. Also, it avoids the thorough network planning required for WLAN networks with multiple base-stations. This is achieved by inband trunking and real-time adaptive network configuration. The link layer protocols will also decrease the systems self-interference.

The proposed solution also implicitly handles the hidden terminal problem, whereas this poses significant scheduling problems in the WLAN approach.

The AMT solution is optimized for both mobile and fixed terminals, where in the system design, special consideration is being given to mobile battery-life.

Compared to a classical PMP (pre-configured Mesh Tier) topology, a Pre-configured Mesh Tier, proposed below, has a higher reliability due to the possibility to connect a node to multiple others, and indirectly to multiple sink-nodes.

Another advantage of the PMT solution, is that not all nodes need to fulfill the LOS or near-LOS (line of sight) requirement to the sink-node, as LOS or near-LOS to any other node which achieves, directly or indirectly, LOS or near-LOS to the sink is sufficient. Hence the PMT solution relaxes the stringent PMP requirements on base-station placement.

DETAILED DESCRIPTION

Figure 1:
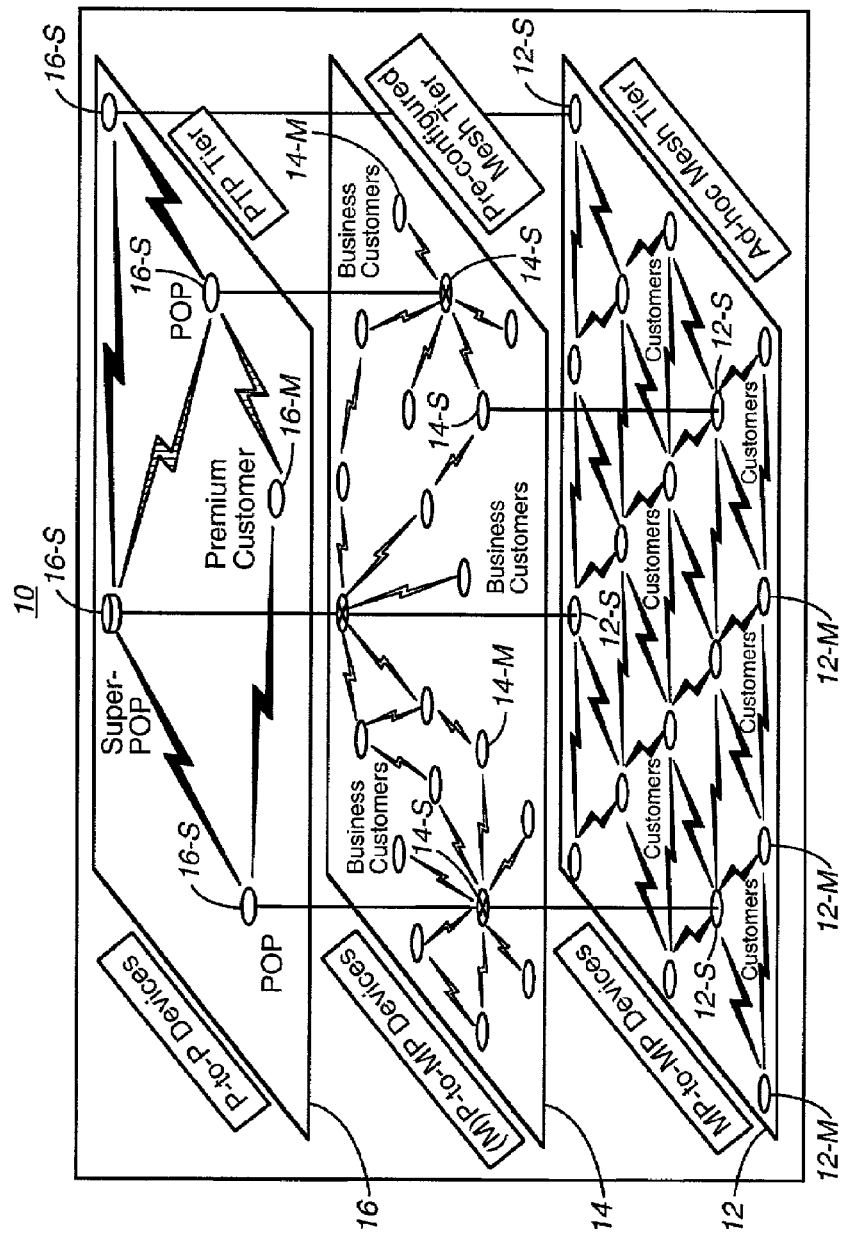
FIG. 1 illustrates a functional representation of the wireless access network of an embodiment of the present invention.

Referring now to FIG. 1, the New Generation Broadband Wireless Internet network, shown generally at 10, has a tiered approach. The AMT 12 is intended for residential and SOHO access (Customers) and the PMT 14 for AMT traffic transport and customers with high bandwidth demand (Business Customers). The PTP Tier 16 serves to either connect single extremely high bandwidth demanding customers (Premium Customer) and PMT hubs directly to the backbone network.

Any of the three tiers 12, 14, and 16 can be deployed separately, while combinations are also possible. Thus, the right combinations of the basic building elements can fulfill a multitude of service provider demands and requests. Suggestions for combinations appropriate to certain common scenarios are explained below.

The proposed network is an outdoors last miles solution. In fact, the network 10 provides a seamless wireless backhaul solution for the aforementioned technologies, in combination with which it provides a wireless solution from for example a PCMCIA card all the way to the ISP POP (Internet Service Provider Point of Presence). Even though not drawn, WLANs and PANs should hence be seen as additional tiers underneath the AMT in FIG. 1.

The network consists of three tiers: AMT, PMT and the PTP Tier 12, 14, and 16.

A mesh network is built around sink nodes by adding mesh nodes. For example the AMT 12 includes sink nodes 12-S and mesh nodes 12-M. Analogously, the PMT 14 includes sink nodes 14-S and mesh nodes 14-M. And, the PTP tier 16 includes sink nodes 16-S and mesh nodes 16-M. Sink nodes located in the area covered by one sink become connected on the mesh tier when a path of mesh nodes is available between them. In this mesh network the traffic flows from one node to another seeking the optimal route to the receiver even though the major part of the traffic tends to come or go to the Internet outside the radio network. Thus, the traffic flow in a mesh network will be mainly from and towards sinks.

Both the AMT and PMT are mesh configurations. The AMT configuration is ad-hoc; devices may appear randomly and establish links to their geographical neighbors. Thus, mobile devices are supported. The PMT configuration, in contrast, is the result of network planning. In the PMT, the devices are stationary and the connections fixed.

Referring now to FIG. 2A-2F, several mesh and mesh-derived topologies are shown. FIG. 2A shows a 6,1-Tree 22. FIG. 2B shows a star topology 24. FIG. 2C shows a multi-leg start topology 26. FIG. 2D shows a 3,2-Tree topology 28. FIG. 2E shows a complete 2-Mesh topology 32. And, FIG. 2F show an incomplete 2-Mesh topology 34. The PMT connects the AMT sinks. The PMT itself has its own sinks, which are either fixed wired backbone or PTP tier (see FIG. 1) connections. The PMT is a mesh topology, but it may be implemented as any mesh derivative. LOS will be required at this tier.

A multi-leg star topology 26 differs from a star topology 24 in that it allows a node to be indirectly connected to the sink (center) node through a maximum of one other node, whereas a star topology requires each node to be directly connected to the sink. It differs from a pure mesh topology in that a pure mesh allows a node to connect to a sink through multiple hops. A multi-leg star 26 allows usage of repeater stations to pass by obstructing objects.

The PTP tier consists of high-capacity LOS links, which serve primarily as backhaul links for the PMT and as access points for customers with extremely high bandwidth demands. Geometry.

Figure 3:
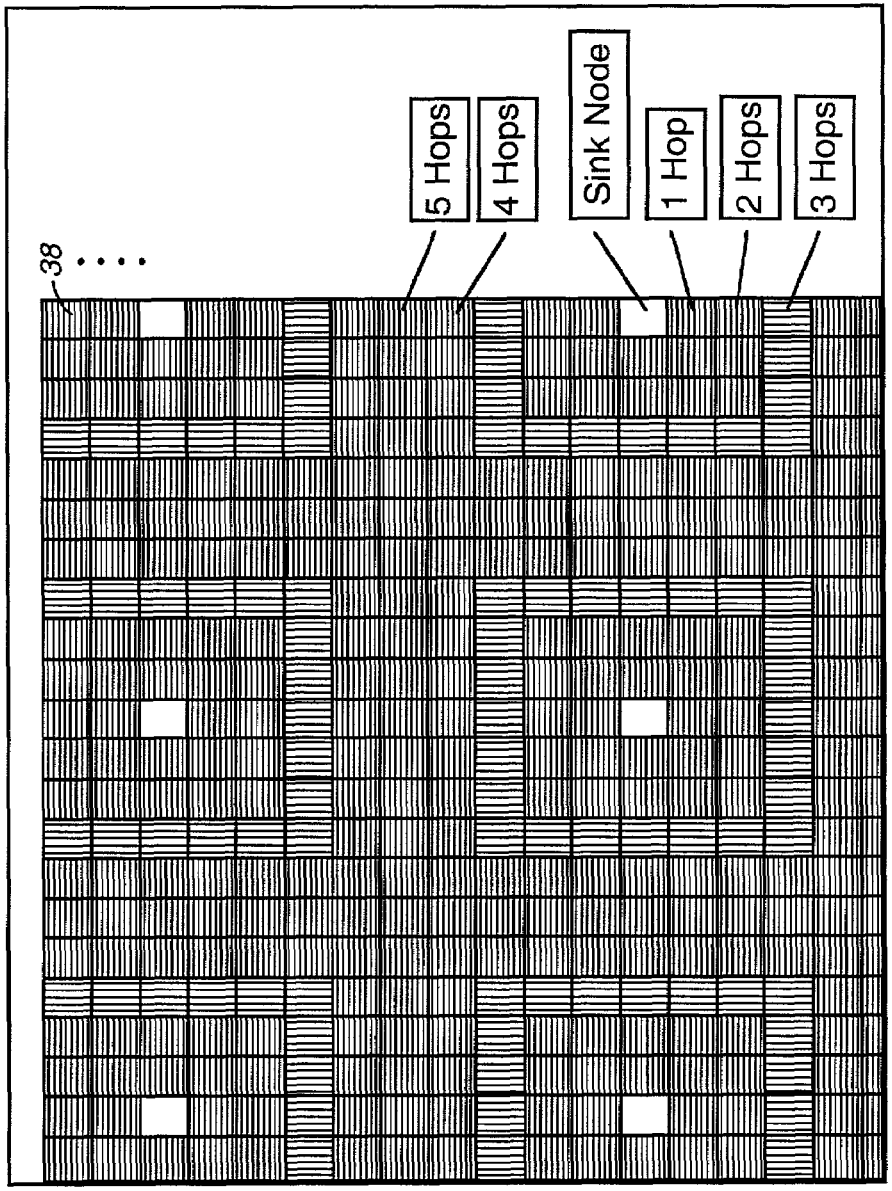
FIG. 3 illustrates a grid in which sync nodes of a tier of the wireless access network shown in FIG. 1, as well as hop-distances therefrom, are represented.

Referring now to FIG. 3, for purposes of modeling, the mesh nodes can be assumed distributed evenly in a square grid 36, formed of a plurality of cells 38. With a maximum hop of four, there will be 64 cells per a sink (including the sink). With five, the corresponding value is 100. Note that it is assumed that the border nodes or cells are shared with the neighboring sinks' border nodes. Thus the total amount of nodes are 64 and 100 and not 81 and 121. The traffic generated at the sink is not by definition using the mesh network, and thus the effective node counts will be 63 and 99. The corresponding numbers for a traditional cellular network geometry, the hexagonal grid, is 47 and 74 respectively.

For the PMT tier, the maximum number of connections per node will be limited because to connect to most nodes, the node will require another antenna. This restriction does not hold for the sink-node, the sectors of which will have to cover 360 degrees.

With the average customer throughput of 200 kbit/s a sink will gather 12.6 Mbit/s or 4 hops and 19.8 Mbit/s or 5 hops. It should be noted that although the average rate appears low, the bursty nature of typical traffic will make the instantaneous throughput at least an order of magnitude higher. If two radios will share the load at the sink, the capacity that each hop in the sink tier must be able to handle becomes ½×19.8 Mbit/s≈10 Mbit/s. This is the maximum required AMT radio throughput. The maximum number of hops allowed will hence be limited by the available link capacity.

The minimum total capacity needed for the AMT and PMT can't he computed by simply multiplying the number of nodes with the desired minimum capacity per node, because each hop consumes a share of the total network capacity. The more hops a data packet makes the more capacity is consumed. On average there are 2.73 hops per customer in the 4-hop case, and 3.38 hops in the 5-hop case as illustrated below.

4 hops: (8×1+16×2+24×3+15×4)/63=172/63=2.72

5 hops: (8×1+16×2+24×3+32×4+19×5)/99=335/99=3.38

Thus, traffic flowing to the sink will require a capacity of 2.72×12.6 Mbit/s=34.3 Mbit/s (4 hops) and 3.38×19.8 Mbit/s =66.9 Mbit/s (5 hops). The capacity factor using 5 hops compared to 4 is 2.72/3.38=0.80 (or 34.3/66.9*100/64), while the factor of sinks necessary is 0.64. (I.e. the capacity is reduced by 20%, but there are 36% less sinks required).

Various network tier combinations and their applications are described below. Before going into details, the environmental conditions must be defined. Five classes are considered: Dense Urban, Urban, Semi-Urban, Semi-Rural and Rural. Sub-classes for these can be defined on a global scale to reflect local variations.

Definition

Dense Urban: City center, 4+story buildings, and no open space between buildings except streets. Building efficiency exceeds 1.00.

Urban: Area around city center, 2-4 story buildings, some open space between buildings may exist. Building efficiency between 0.50-1.00.

Semi-Urban: City center of small city, 1-3-story buildings, fair amount of open space around buildings. Building efficiency 0.30-0.50.

Semi-Rural: Single family housing area, 1-2-story buildings, lots of empty space between, sight possibly restricted by trees & fences. Building efficiency 0.10-0.30.

Rural: Buildings make up a minimal part of the area. Building efficiency less than 0.10 (normally a lot less).

Building efficiency is defined as the ratio between the sum of the total floor area (including the walls) and the land area being used (e.g. for single family dwellings the building normally occupies just a fraction of the total available area).

The most probable utilization scenarios for the five different environments are introduced below. Obviously any combination is available in any case, but the business case parameters and economics favor some combinations to others. Thus, one of the key issues of flexible network deployment can be handled by choosing the appropriate network elements. Dense urban area is a difficult radio environment especially if LOS is required. In downtown the business penetration is relatively high. Thus, the capacity demands becomes fairly high. LOS is required for this high capacity, but it is laborious to arrange, and thus the wireless solution has severe drawbacks in this environment. Nevertheless, PTP tier radios can be used to cost efficiently connect office buildings. The AMT can be used to offer service for mobile users.

Urban areas offer the highest probable customer density with a useful radio environment. Here the full concept can be utilized, as the probability for LOS is much higher than in the dense urban case. In case the capacity required by the customers is low, then the PTP tier can be left away.

Semi-urban areas are most suitably handled by the AMT for access and the PMT for transport. If higher capacities are required and the distances are suitable for PTP radios, then the full concept can be considered. A PMT only solution to attract only business users is feasible.

Semi-rural areas are mainly occupied with residential users. As the area is normally quite huge compared to the capacity need, the PTP tier is not necessary. For last mile access to residential customers, the AMT based approach is sufficient. If only higher capacity customers are served, then the solution is PMT.

Referring now to FIGS. 4A, 4B, and 4C, rural areas have a very low customer density. A PMT is the most suitable. If cheaper radios are desired and lower throughput can be tolerated, then AMT radios with additional directional antennas can be used. The network topology here is fully dependent on particular case but could be a multi-leg star 26, simple mesh 36 or a combination of these 26/32.

Figure 5:
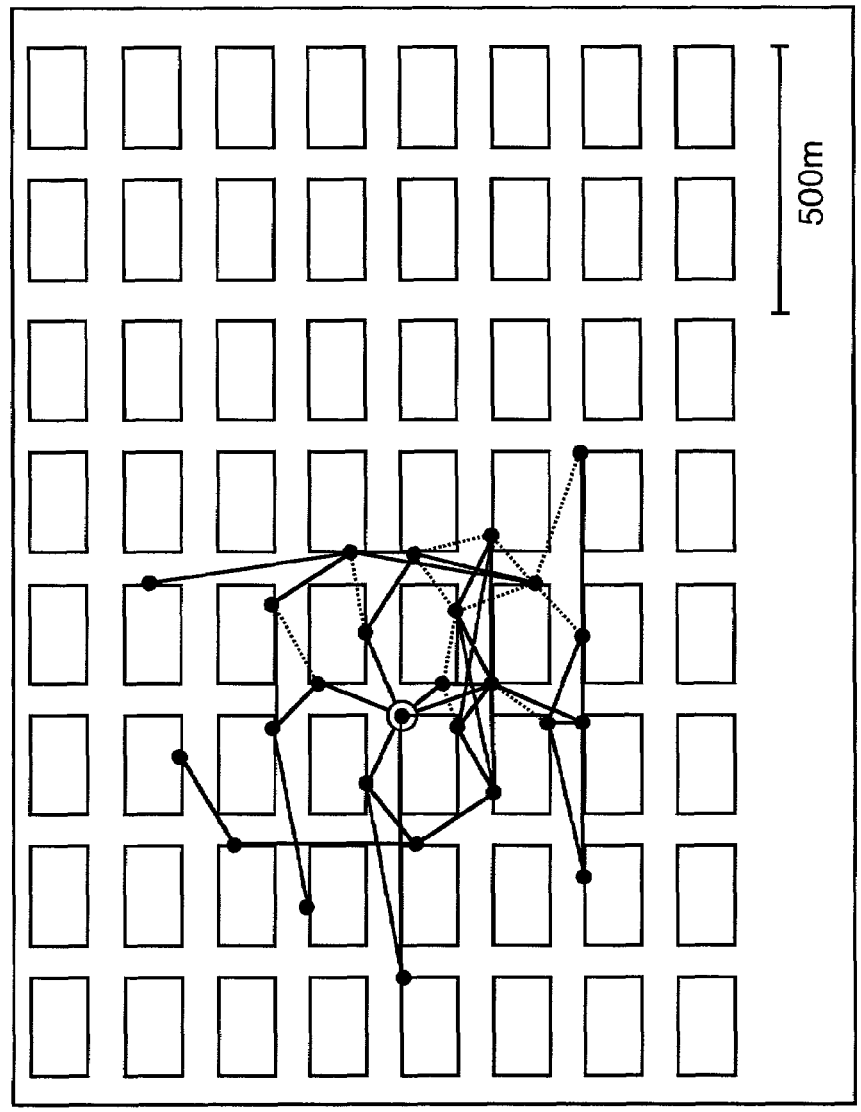
FIGS. 5-8 illustrate deployment of an ad hoc tier of the wireless access network shown in FIG. 1 here, deployed in an urban environment in various usage configurations.
Figure 6:
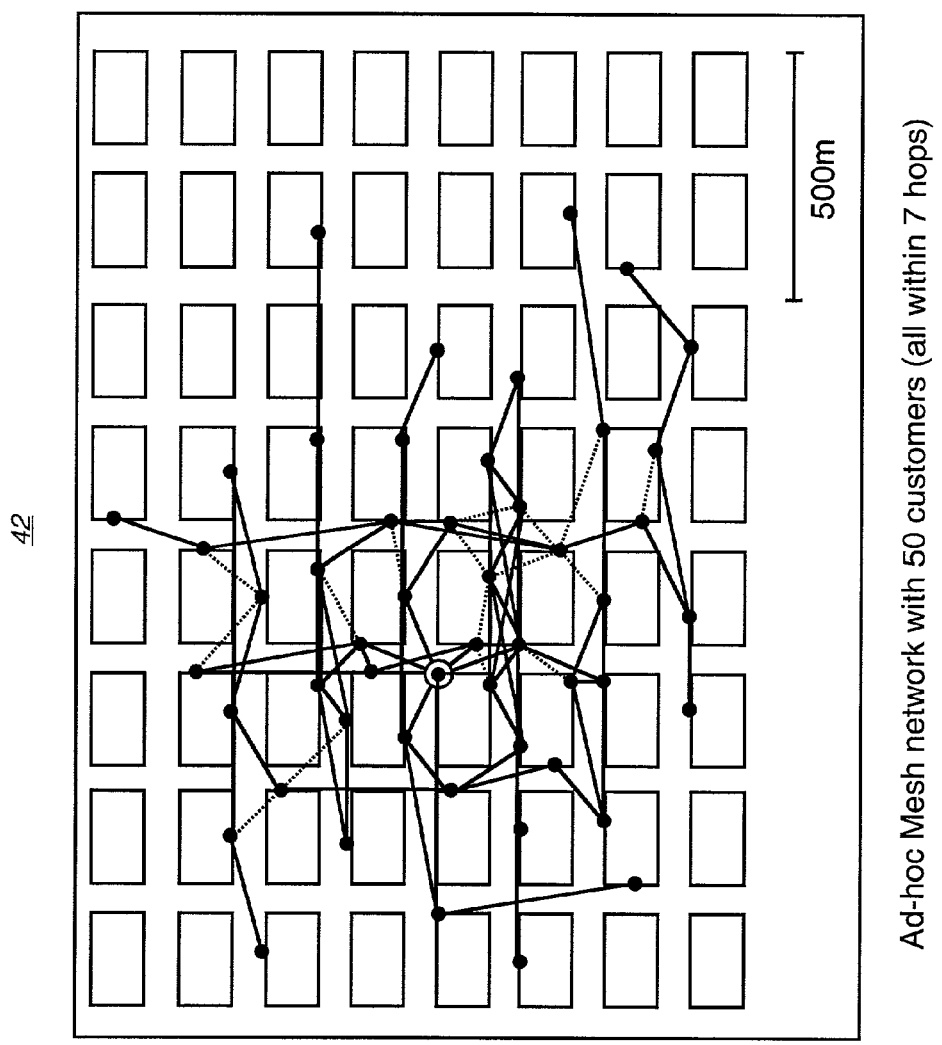
Figure 7:
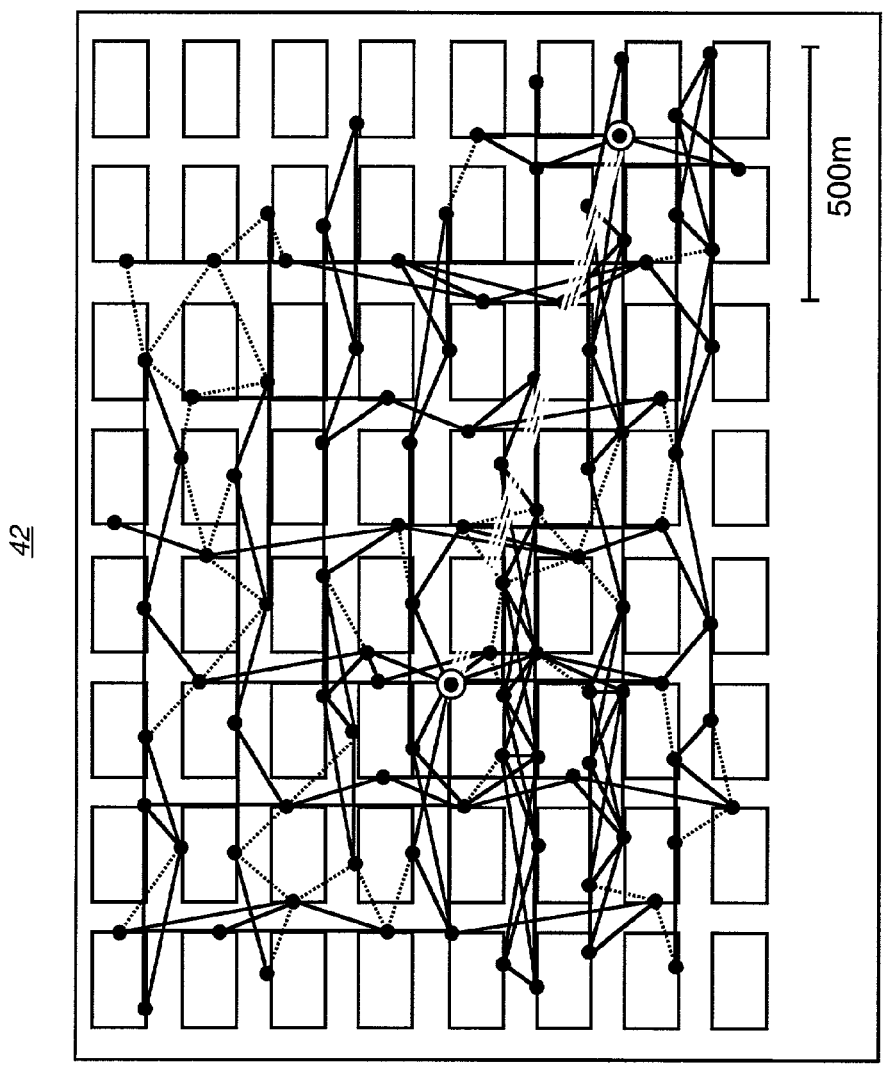
Figure 8:
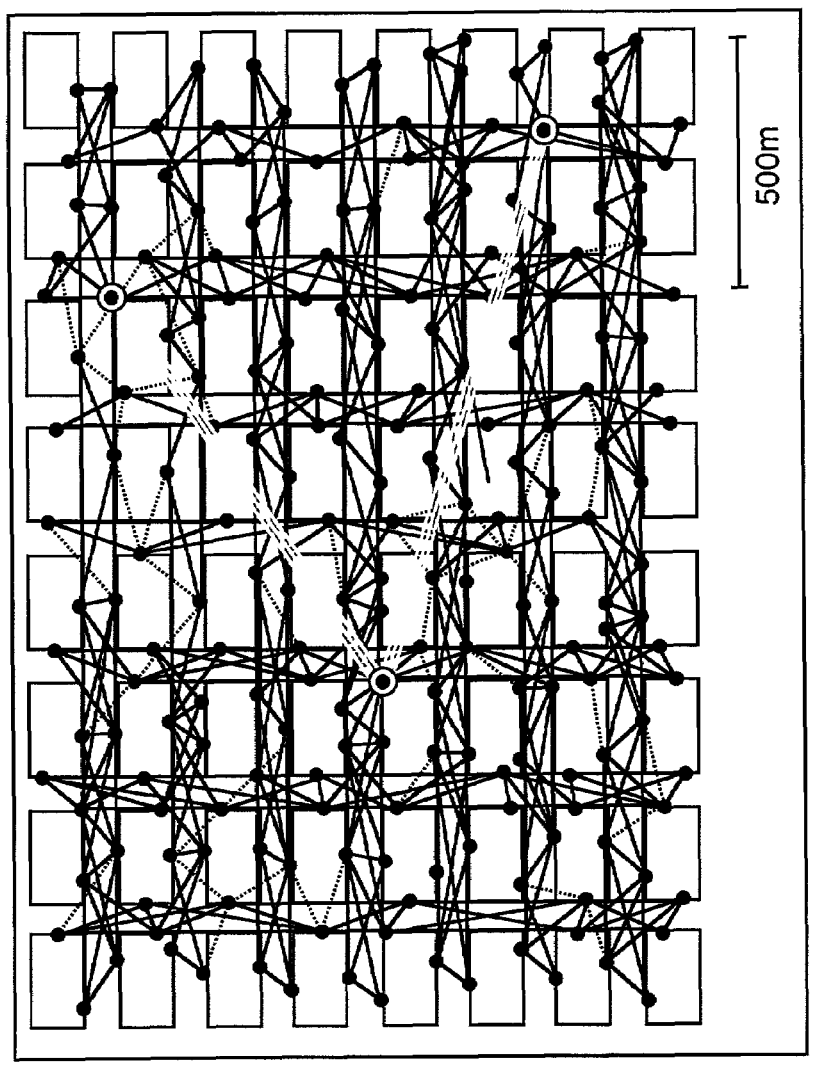

Referring now to FIGS. 5-8, the deployment of the AMT in an urban environment 42 is shown. FIG. 5 shows deployment with a customer base of twenty-five, all of whom are within a five-hop distance of each other. FIG. 6 shows deployment with a customer base of fifty, all of whom are within a seven-hop distance of each other. FIG. 7 shows a deployment with a customer base of one hundred, all of whom are within a five-hop distance of one another. And, FIG. 8 shows a deployment with a customer base of two hundred all of whom are within a five-hop distance of one another. In this environment the NLOS (dotted lines in the figures) operation is beneficial helping to reach all potential customers. As the customer base grows and the customer density as well, the need for NLOS operation gradually diminishes. At some level only LOS operation is considered anymore. This is the right moment to introduce new technology (e.g. 60 GHz radios).

With higher customer density the cell size decreases. The shrinking of the cell is made by power control. The transmit power is always adjusted to the minimum required level for the information to get through. This has an interference decreasing effect. Nevertheless, the performance must be strengthened by usage of space diversity (directional antennas). Traditional directional antennas are not feasible, as the beam direction must be adjusted according to the position of the other end. Smart and semi-smart antennas will be promoted.

Directional antennas and a clever frequency re-use scheme are mandatory when the LOS probability increases. In that case, not only does the end point lie within LOS, but also an increasing number of the other devices. This is a limiting factor to shrinking cells. Thus, systems with worse propagation characteristics and more available bandwidth are foreseen. Even optical transmission can be considered at this point at least for the fixed installations.

Figure 9:
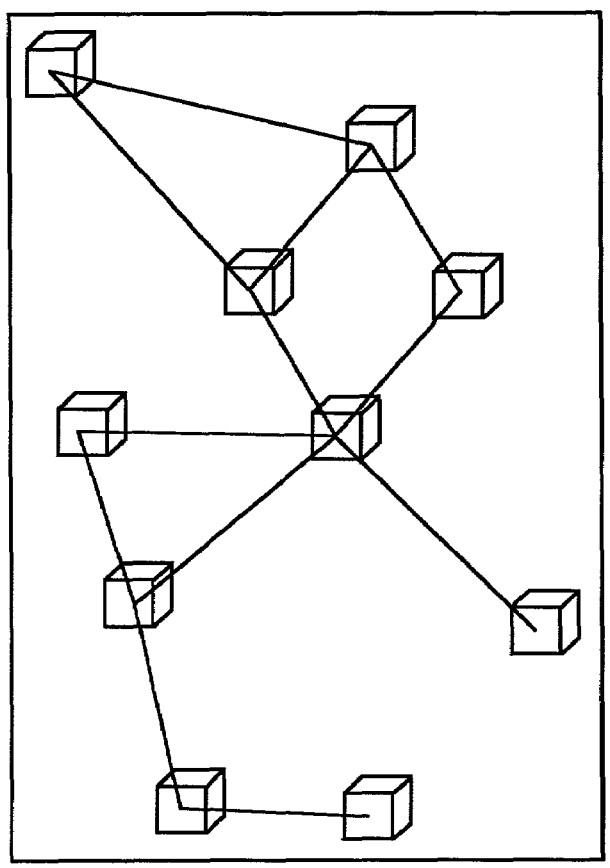
FIG. 9 illustrates deployment of the wireless access network shown in FIG. 1 in a rural environment.

Referring now to FIG. 9, in rural areas the customer density might be very low. There is a clear need for extended range. In this case the AMT can be deployed in a LOS manner (LOS is generally easily achieved in rural areas, and hence a weak constraint). This might assume locating the antennas on high constructions and even professional installation and alignment of the antennas. Optional very high gain directional antennas can be used to extend the range further. Nevertheless, the mesh functionality can be used when available creating redundant paths.

The PMT is capable of serving as sink tier for the AMT, the capacity of each PMT node should be at least 12.8 Mbps (matched to the 4 hop max. mesh case) or 20.0 Mbps (matched to the 5 hop max. mesh case). Hence, as a stand-alone application, the PMT will typically serve as the lowest tier of the backhaul network for businesses or apartment complexes, which have a private (wired or wireless) LAN, or as MAN (Metropolitan Access Network) to connect clusters of buildings like in university campuses.

Since entirely isolated networks are exceedingly rare, a PMT will likely have sinks to wireless PTP nodes and/or wired network backbones.

A flexible increase in range by decreasing the throughput should enable usage of the PMT tier as primary tier to provide access for customers in (semi) rural areas.

The PTP Tier consists of high throughput (>100 Mbps) point-to-point links, which can serve as backbone network for the above PMT, and as access point for customers with very high data-rate demands or a combination thereof. The only feasible sinks for this tier are wired "internet backbones".

As with the PMT above, a tradeoff between throughput and range should be facilitated to allow effective usage in both high-density (urban) and low-density (rural) areas.

Deployment of the complete concept as shown in FIG. 1 will be most feasible in urban areas with either solely residential customers, or a mixture of residential and business customers. The AMT will be deployed to facilitate low-cost connections to individual residences and businesses with low throughput needs, while the PMT will serve as sink tier for the AMT and to facilitate access for businesses with medium throughput demands. The PTP Tier in this case serves as backhaul tier for the PMT and to facilitate access for businesses with high throughput demands.

Since the allocation and terminology of spectrum allocation differs nation to nation, the data presented below should be considered an example only.

The AMT can (in the USA) be implemented in the U-NII band (regulated in Part 15, Subpart E), which is assigned three slots of 100 MHz each at 5.15, 5.25 and 5.725 GHz respectively. If ISM band regulations are fulfilled, then an additional 50 MHz is available (5.725-5.875 GHz ISM). The lack of licensing in these bands allows for fast, flexible deployment of devices.

The AMT transmissions will consist of control slots and data slots. The transmission of the control slots will be done in one of the channels in the highest band (due to the allowance of the highest power in this band), which can be selected arbitrarily by the operator. During the transmission of these control slots, all other channels will be silent. Data slots will be scheduled in the remaining time, spread out over all channels, where the scheduling will take the maximum allowed power in that channel into consideration.

TABLE 1

U-NII bands and power regulations (USA example)

| Band (GHz) | Max. Output Power |
|---|---|
| 5.15-5.25 | 200 mW |
| 5.25-5.35 | 400 mW |
| 5.725-5.825 | 800 mW |

Figure 10:
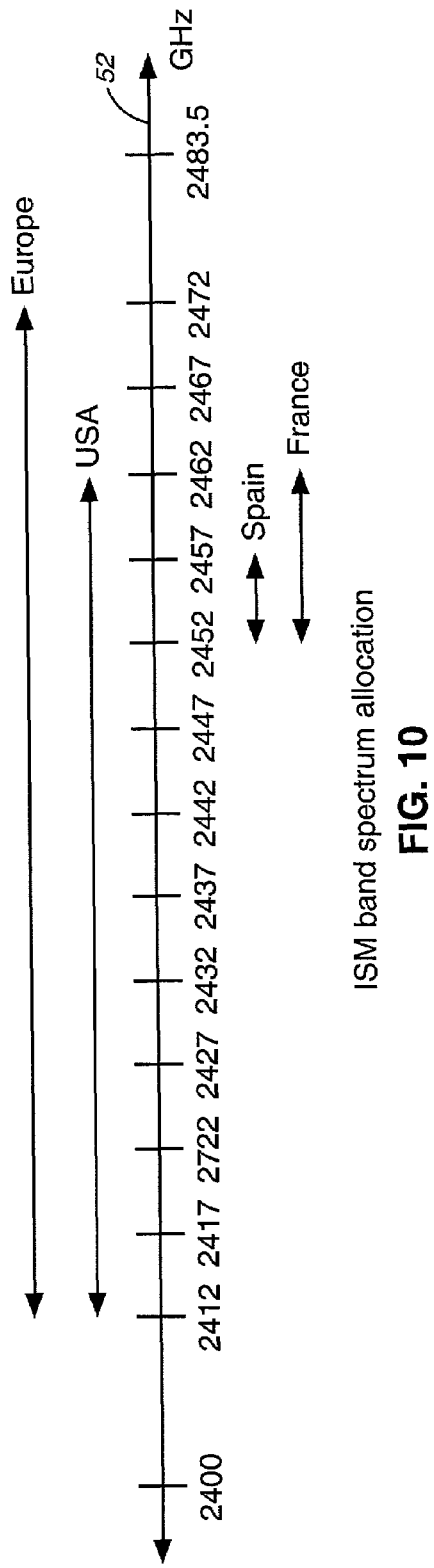
FIG. 10 illustrates a frequency chart illustrating frequency bandwidths in which the wireless access network shown in FIG. 1 is implementable in exemplary implementation in various geographical regions.

Referring now to FIG. 10, alternatively, the AMT can be implemented in the 2.4-2.4835 GHz ISM band 52. This band requires a minimum 6 dB bandwidth of 500 kHz [5,$15.247 and allows a peak output power of 1 Watt (omni-directional). WLAN standards divide this band into either 13 (Europe) or 11 (USA) channels 5 MHz channels, which is however not a regulatory demand. Clearly, lack of allocated spectrum makes full deployment of the invention in the 2.4 GHz ISM spectrum in Spain and France difficult. However, an adaptation, with reduced spreading (requiring less bandwidth, but reducing the throughput) can be considered.

Figure 11:
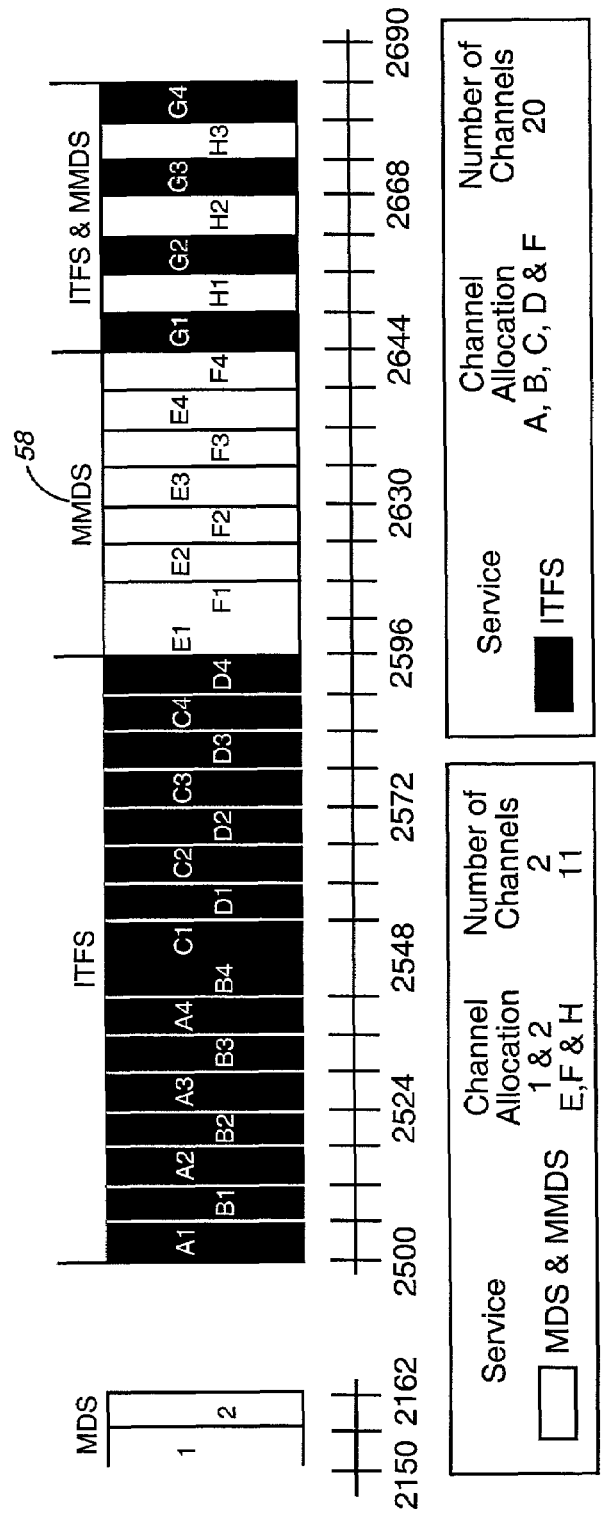
FIG. 11 illustrates a frequency chart illustrating the bandwidth regions in which the wireless access network shown in FIG. 1 is implementable in another embodiment of the present invention.

Referring now to FIG. 11, another option would be deployment in the MMDS (Multi Media Distribution System) bands 58 which are currently heavily under-used.

Figure 12:
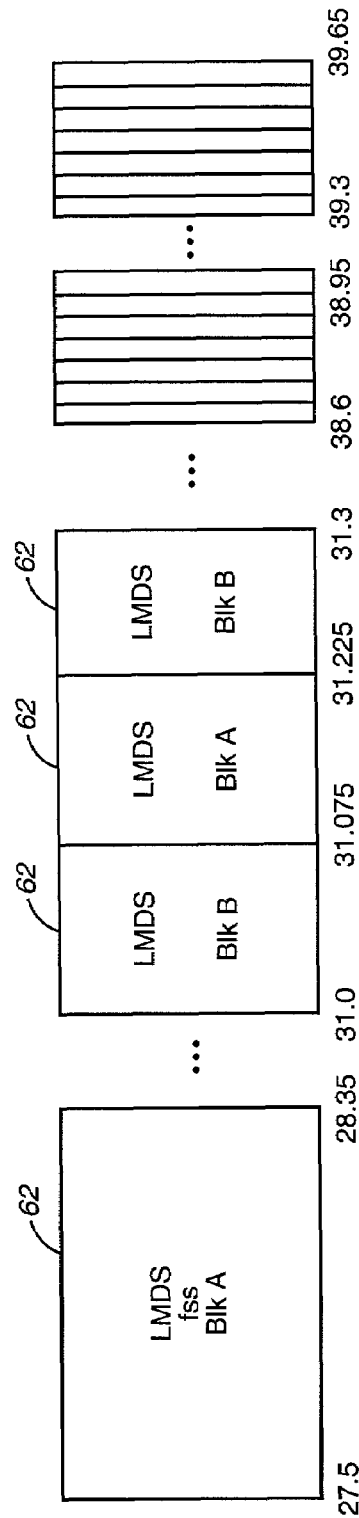
FIG. 12 illustrates another frequency chart illustrating implementation of another embodiment of the wireless access network shown in FIG. 1.

Referring now to FIG. 12, the PMT tier can be implemented in the LMDS bands 62, the allocation of which is shown. These bands are regulated in Part 101, and require licensing.

The PTP Tier's spectral location will heavily depend on the technology used. For example implementations on traditional microwave links and infrared are possible. PTP links generally require a license for each link separately, rather than licensing of a frequency band in a certain region.

ITU spectrum allocation recommendations for PTP systems are defined throughout the range of 1 GHz up to 57 GHz. Equation (1) below defines the required channel bandwidth (B) for a certain bitrate (R), $$B = \frac{(1+\alpha)R}{\log_2 M}, \qquad \text{Equation 1}$$

where $\alpha$ is the cosine roll-off factor (generally 0.2-0.5), R the bitrate and M the number of modulation levels. For example a 155 Mbit/s radio with 64-QAM would require a bandwidth of 40 MHz.

Figure 13A:
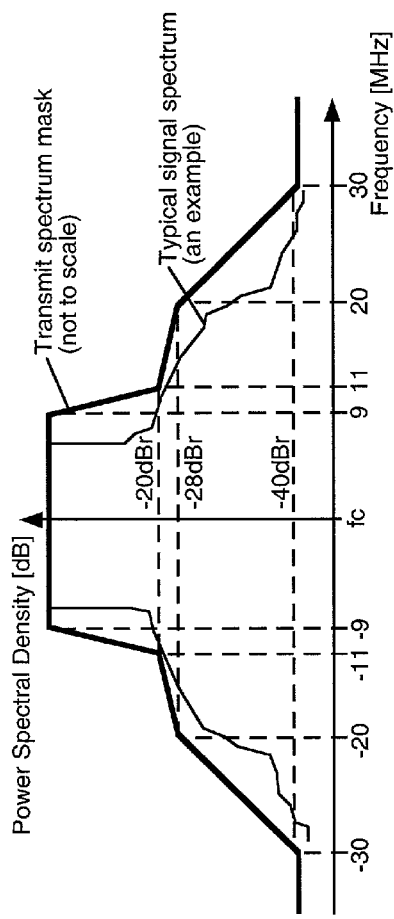
FIGS. 13A and 13B illustrates spectral mask of modulation schemes utilized pursuant to operation of an embodiment of the wireless access network shown in FIG. 1.
Figure 13B:
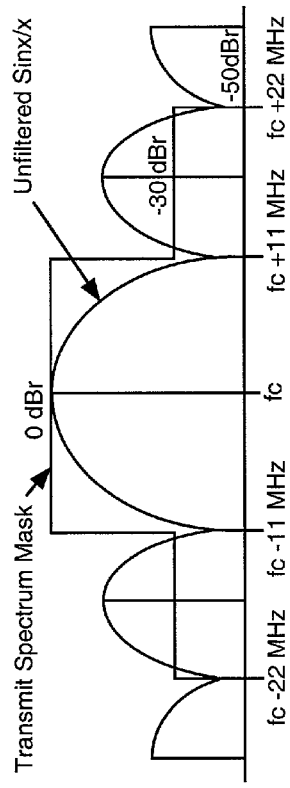
Figure 14:
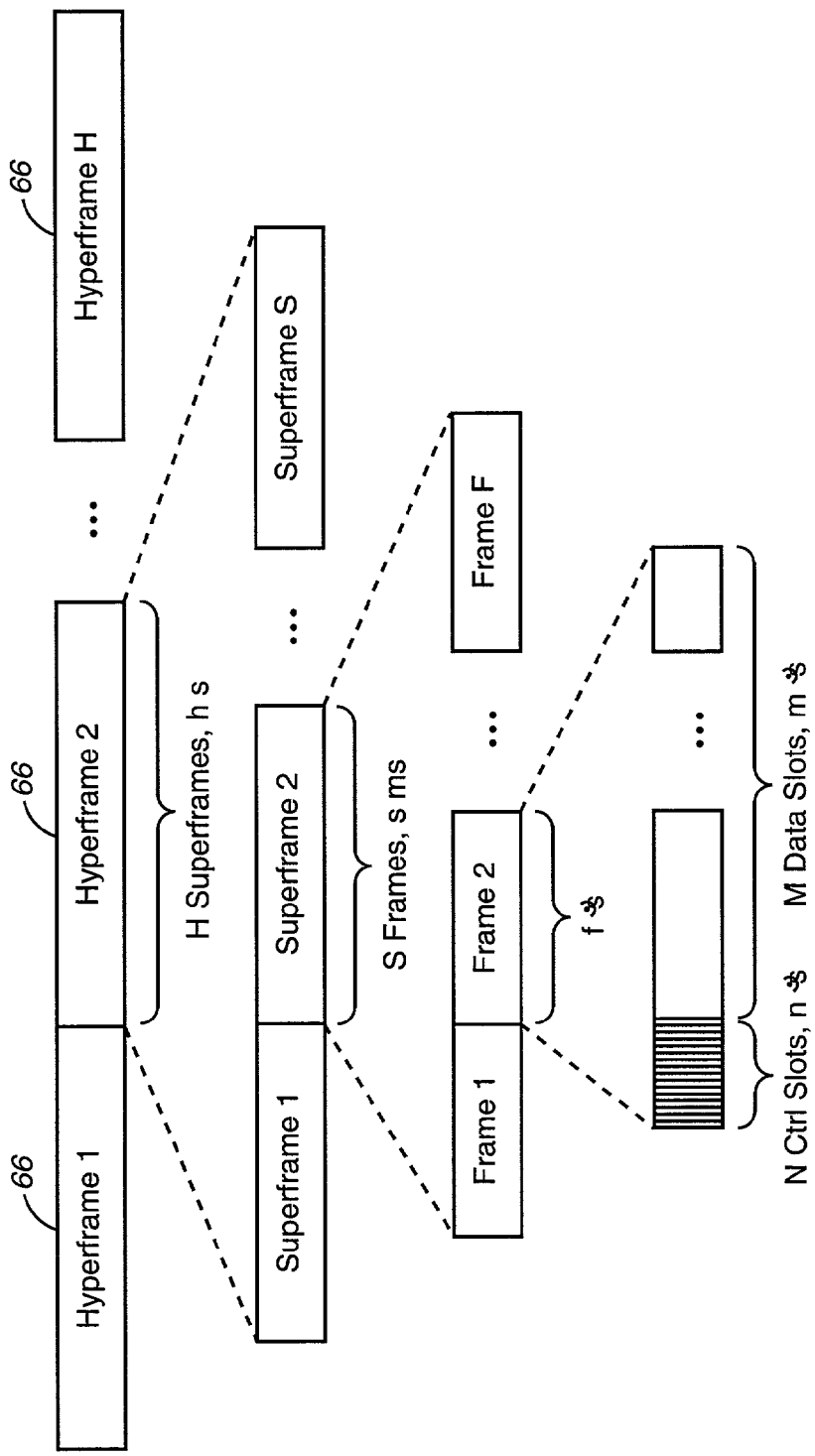
FIG. 14 illustrates a representation of the frame structure of the wireless access network shown in FIG. 1 of an embodiment of the present invention.

Referring now to FIG. 13 and 14, in the physical layer of the AMT, a sharp distinction is drawn between control-slots and data-slots. The reason for this is, that a transmitter must use the modulation/parameters described in above while transmitting in a control slot, while in the data-slots, a transmitter-receiver pair is free to negotiate any modulation/parameter set. The transmitter and receiver must however be able to also use the control-modulation/parameter set for data transmission.

Each static device receives by default all control messages. Transmission of control messages is necessary when joining the network, exchanging routing information, reserving transmission slots, acknowledging packets and for notification of existence.

Mobile devices are normally battery driven and have thus a limited amount of power. Power saving techniques are thus mandatory to extend the battery life. The greatest amount of power can be saved by minimizing the transmission and reception times. To do this the mobile device is not anticipated to route traffic from other devices unless it is the only connection. This will heavily reduce the transmission time down to the minimum required by the mobile user.

Figure 4:
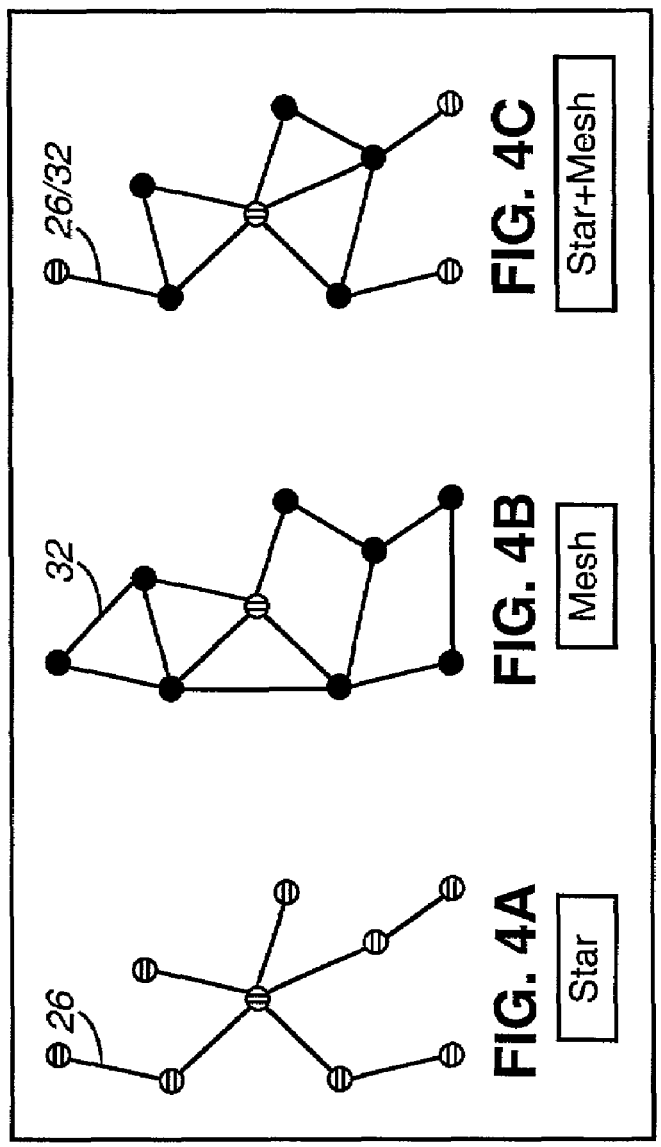
FIGS. 4A-C illustrate various of the network topologies of a tier of the wireless access network, exemplary of topologies employed when the network is implemented in a rural area.

Nevertheless, receiving all control slots every frame is too power consuming for a mobile unit. Thus, as shown in FIG. 4 a hyperframe 66 is introduced. The hyperframe consists of a number of superframes extending a time period of 1-2 seconds. The mobile device is only receiving the control slots during the first superframe of each hyperframe when it is in stand-by mode and will acknowledge its presence during the next superframe of the same hyperframe. The fixed units know this and can buffer their requests to the appropriate superframe. During active mode, the behavior of a mobile device is the same as that of the fixed devices.

The type of spreading, modulation and coding is dependent on the frequency band of implementation and the regulations in the country of deployment. However, the spectral masks will conform to the 802.11(a/b) standards to facilitate interoperability and co-existence (ETSI/BRAN spectral requirements do not exist to date).

Devices will be capable of frequency agility, meaning that they will be able to support at least a minimum set of modulation schemes. One modulation scheme will be designated for use in the control slot. Using this scheme, devices may agree on using another modulation scheme in the data-slots, either from the minimum required set of schemes, or from additional (not yet specified) schemes. This procedure allows the agility of adoption of future (higher rate) modulation schemes, and also provides for interoperability capabilities.

The aim set for the physical layer is that the overhead is less or equal than 2.5%. It is assumed that the size of a control packet will be a fixed $N_c \approx 256$ bits. It is assumed that the same technique will be used in the basic traffic mode. Calculation of control overhead percentages is based on this.

Figure 15:
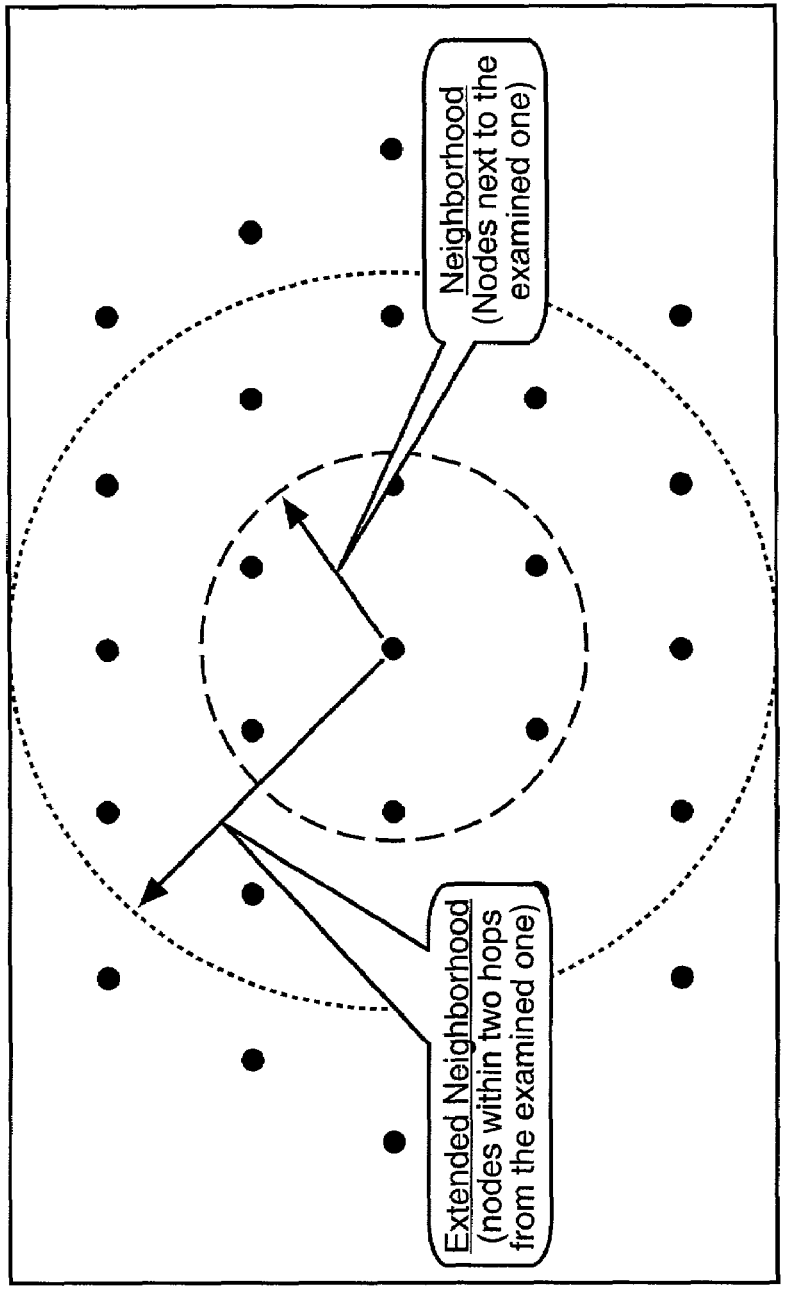
FIG. 15 illustrates a representation of a neighborhood, defined pursuant to an embodiment of the present invention, pursuant to which an embodiment of the wireless access network shown in FIG. 1 is formed.

Referring now to FIG. 15, a number of 24 CPEs (Customer Premise Equipments) per extended neighborhood is assumed, with peak usage of 50%, which results in a 24*0.5/3=4 control-slots/frame requirement (3 frames/superframe). Since a control-slot is a necessity for a CPE to connect, we opt for 8 slots/control-block, which significantly increases the probability for a CPE to find an empty control-slot at first try.

The duration of a frame will be approximately 50, hence an overhead of 2.5% leads to a maximum control-slot duration of $T_{ss}=50*0.025/8=156.25$ µs. Assuming a guard interval of $T_{sg}-6.25$ µs between slots, the effective chip-rate becomes $R=N_c/(T_s-T_{sg}) \approx 1.7$ Mbps. Since a much higher data capacity is required, clearly a different spreading/modulation/encoding tactic can be employed for the control part than for the data part.

For the spreading, the choice exists between 11 Mcps DSSS and 6 Mbps OFDM. Using DSSS, the 802.11 2 Mbps Barker method, or the 802.11 CCK based 5.5 or 11 Mbps methods can be applied.

The choice of the method to be used as basic modulation type, to be chosen out of the above is left open for further study. Other modulation types for the data part besides the ones mentioned above, are the 802.11a OFDM based rates of 9 through 54 Mbps.

Typically, WLAN is designed to operate using cells with an approximate maximum radius of 100 m. The proposed solution will, by means of more agile modulation (for example increasing delay-spread) and error-resistive coding, allow ranges of at least 1 km LOS and a few hundred meters NLOS. Different combinations of modulation and encoding methods will be studied to improve interference and error resilience. For example space-time coding could provide a superior solution to the existing WLAN standard, which uses CCITT CRC-16. Narrowband pre-filtering to suppress narrowband interference will be examined. This can for example be achieved by using the results of a spectral analysis performed through the FFT engine.

Figure 16:
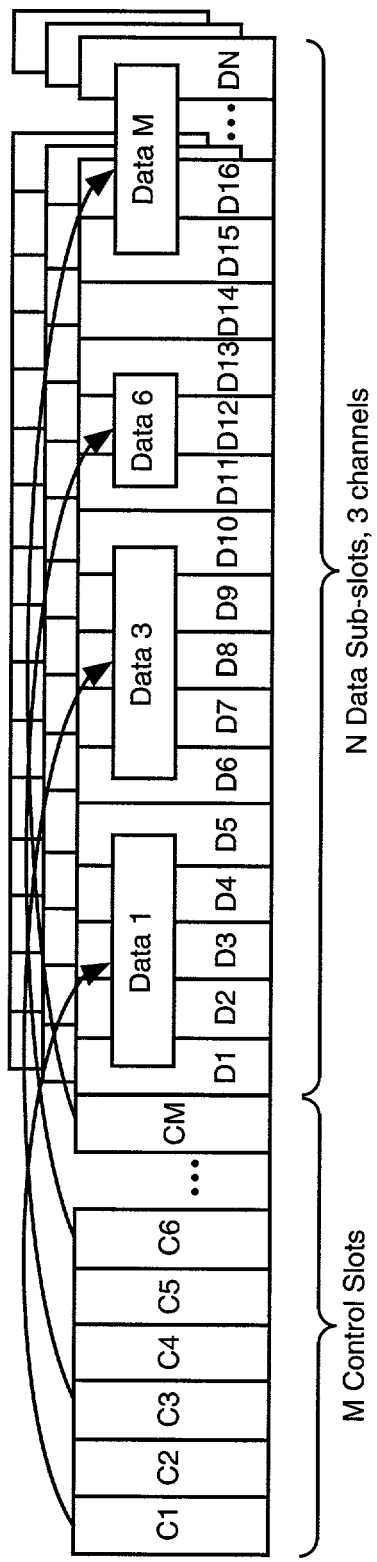
FIG. 16 illustrates an exemplary data slot reservation example pursuant to which an embodiment of the wireless access network shown in FIG. 1 is operable.

Referring now to FIG. 15 and FIG. 16, the link layer selects a free control slot in a superframe based on MAC address and network time (superframe & frame nr.). Possible control slot contention is resolved by different hashings, making use of the fact that each node knows its extended neighborhood, enabling both contending parties to calculate the contention winner without further transmissions. Control-slots are only found in one channel, due to the inability of devices to process multiple channels simultaneously.

The neighborhood of a device is defined as all other devices that the device communicates with directly. The number of these devices will be limited. These devices are said to be one hop away. The extended neighborhood of a device is defined as all devices that neighbor this device's neighbors (excluding the device itself). These devices are said to be two hops away.

A user holding a control slot can reserve data slots in the frames of the superframe starting with that control-block on all data-channels. An additional persistency parameter can designate the same reservations in a limited number of further superframes. Reservations must be scheduled such, that no interference will occur in the extended neighborhood. An example of this is given in FIG. 16 for one frame only, using 3 channels). Only reservations for the first channel are shown.

By allowing the user to reserve, given certain limitations, slots as needed, a bandwidth on demand architecture is created. The possibility to reserve a number of frames ahead allows the user to create a virtual circuit of short duration. Users will not only make reservations for transmitting, but also for receiving, to resolve the hidden terminal problem.

Further, users may attempt to transmit unreserved datagrams in empty data-slots.

Allocation of slots will be based on parameters such as availability, process priority, user priority, recent bandwidth demand history etc.

The proposed solution will mandate the use of digital power-control and AGC to reduce interference. Especially for fixed devices, the overhead cost for this will be negligible.

Since the link protocols can schedule multiple channels simultaneously, the channel management can schedule around interference in a channel by using alternative channels. For example periodic interference sources can be easily avoided by scheduling around it either in time (in the same channel), in frequency by selecting other channels during the interference interval or by both.

The scheduling protocols solve the hidden terminal problem by knowing the transmission AND receiving schedule of their neighbors.

If the node is equipped with smart antennas, the scheduling protocols may use the spatial knowledge to determine whether its own beam will cause interference with beams of neighboring transmissions. The adaptive antennas in fact add a third degree of freedom, namely space, to the decision process already defined in time and frequency.

The scheduling protocols above do not require any overhead, as possible contentions are resolved by etiquette rules running in each individual node. Since each node uses the same rules, it can compute the contention-avoidance decision of the other nodes, and thus without overhead agree on a contention-less solution.

The link layer will provide hop-by-hop reliability.

Contrary to cellular networks, the AMT will be a self-configuring topology based on distributed algorithms, which heavily rely on the notion of the extended neighborhood. The network layer will facilitate flow control. That is, it will ensure that no flow unfairly dominates the available bandwidth. It will also ensure that the local CPE does not exceed the QoS level it is entitled too.

The routing algorithms will be such that they can provide both optimum paths between nodes (for static nodes) and viable paths between nodes (for mobile nodes).

The transport layer will support PPP (Pinto to Point Protocol), SNMP (Simple Network Management Protocol), TCP (Transmission Control Protocol), IP (Internet Protocol), IPSEC (Secure Internet Protocol), UDP (User Datagram Protocol), RIP (Router Information Protocol), ICMP (Internet Control Message Protocol), TFTP Trivial File Transport Protocol), SLIP (Serial Line Internet Protocol), ARP (Address Resolution Protocol), telnet, and any other emerging protocol that may be perceived as common for "wired internet".

The aim of the network management in the AMT is to allow the network operator to change any desired parameter or protocol functionality in any remote device without any onsite maintenance. For this purpose, all devices must be SNMP-compatible, and allow the operator to ftp new software into the device.

Network management for this tier will be part of the overall network management functionality.

Figure 2:
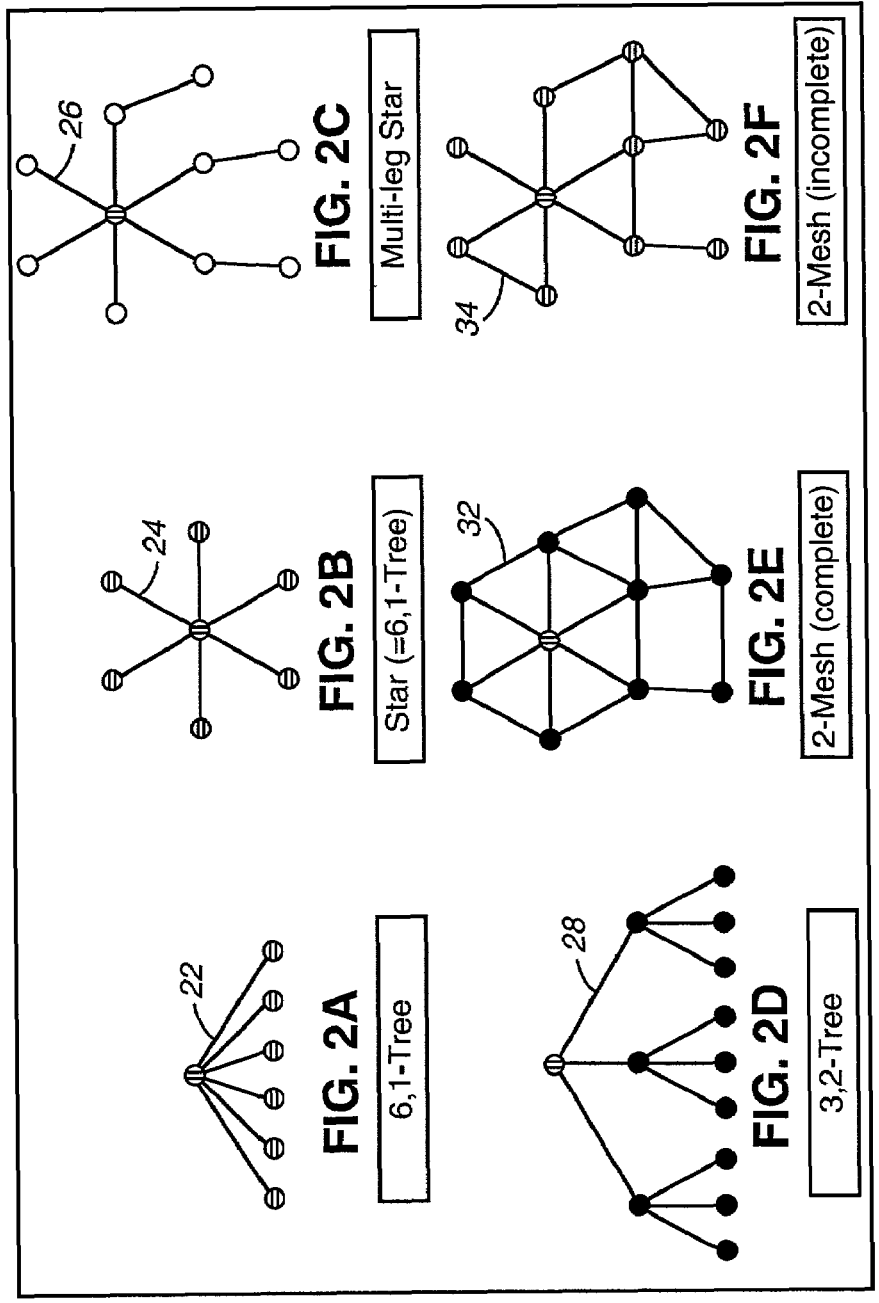
FIGS. 2A-F illustrate various examples of network topologies of which the nodes of the various tiers of the wireless access network shown in FIG. 1 are formed.

The devices in the PMT are configured to operate in a mesh network. However, since the links are pre-configured, the operator may choose to plan the topology of this tier in any mesh derivative desired. Examples of mesh-derivatives topologies are shown in FIG. 2.

The PMP tier is intended both for AMT trunking and high capacity access. It can thus be deployed in conjunction with the AMT or on its own depending on the scenario. The radio throughput is in the range of 100 Mbit/s. The PMT system can be deployed on the unlicensed bands, but with the required high reliability it is recommended that licensed bands be utilized. The high reliability demand inherits from the trunking requirement. It is also anticipated that higher capacity customers do expect better QoS (Quality of Service) than what the AMT can provide.

The system is planned in a traditional cellular manner where the placement has a great impact on the coverage and service offerings. The number of customer locations is generally limited by LOS between nodes. When the throughput demand exceeds the capacity of a sector, the sector can be split in two, though an additional hub radio is obviously needed here. Adjusting the width of the sector is a tool to adapt to the capacity demand.

To satisfy further capacity or coverage demand, several hubs can be deployed. Careful network planning (=hub location and channel usage) is mandatory due to the LOS operation. Narrowbeam antennas are used in the CPEs (customer premise equipment) to partly suppress the interference. Installation of a CPE is semi-professional requiring the skill to align the antenna properly. Each PMT CPE can be connected either to a customer's network (e.g. LAN), an AMT radio or both. The last alternative ensures an easy way of deploying AMT sinks and providing the trunk simultaneously. Thus, the growth of the PMT network automatically increases the seed spots for the AMT network in this scenario.

Physical Layer

An ETSI (European Telecommunications Standardization Institute)/HIPERACCESS, IEEE 802.16 or any other major LMDS standard based physical layer is anticipated. With LOS operation the greatest challenge is to provide the throughput. Interference minimizing and resilient solutions are recommended to maximize the total capacity.

The PMT link layer supports a pre-configured mesh. Its own MAC scheme might be used, although, the AMT MAC could be used with considerable overhead and inflexibility.

Figure 17:
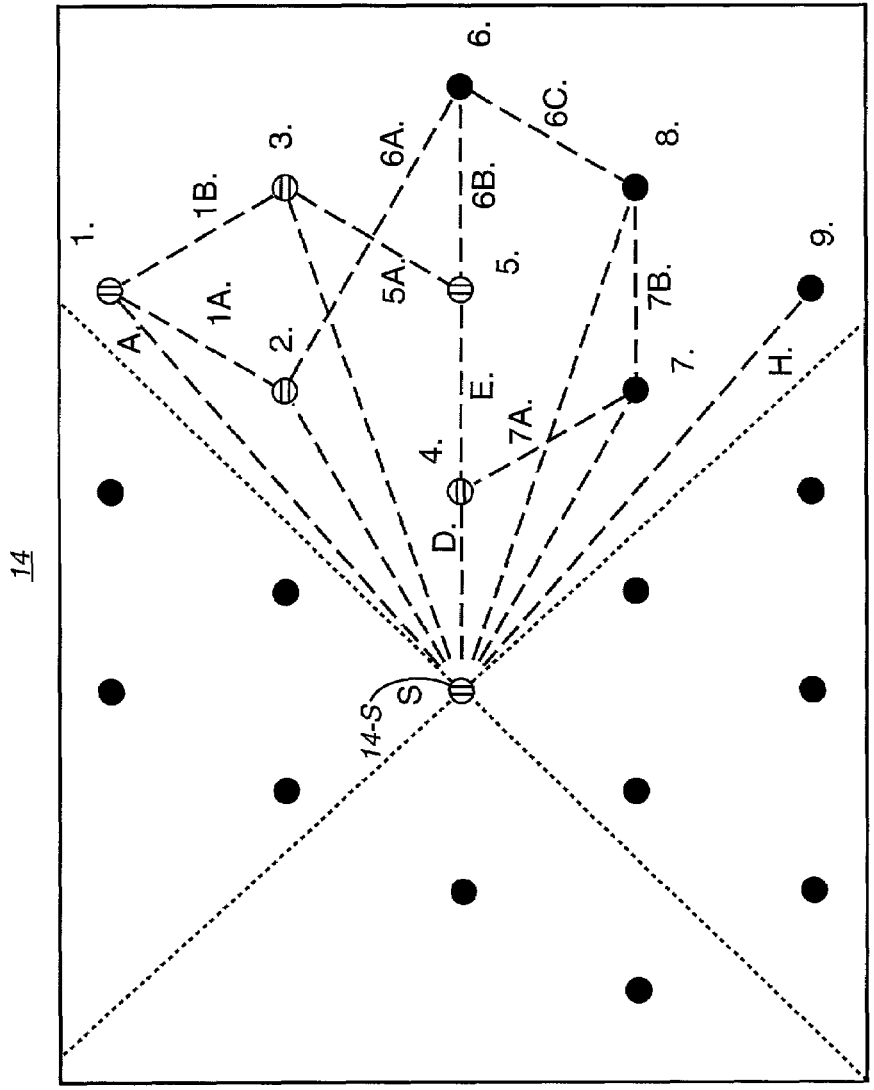
FIG. 17 illustrates a representation of a pre-configured mesh tier (PMT) forming a portion of the wireless access network shown in FIG. 1 pursuant to an embodiment of the present invention.

Referring now to FIG. 17, a typical PMT tier 14 scenario with only one sink, 14-S, is shown. All nodes except node 6 are connected directly to the sink 14-S. The mesh functionality will in this case mostly improve the redundancy. Some routing alternatives are also provided.

Figure 18:
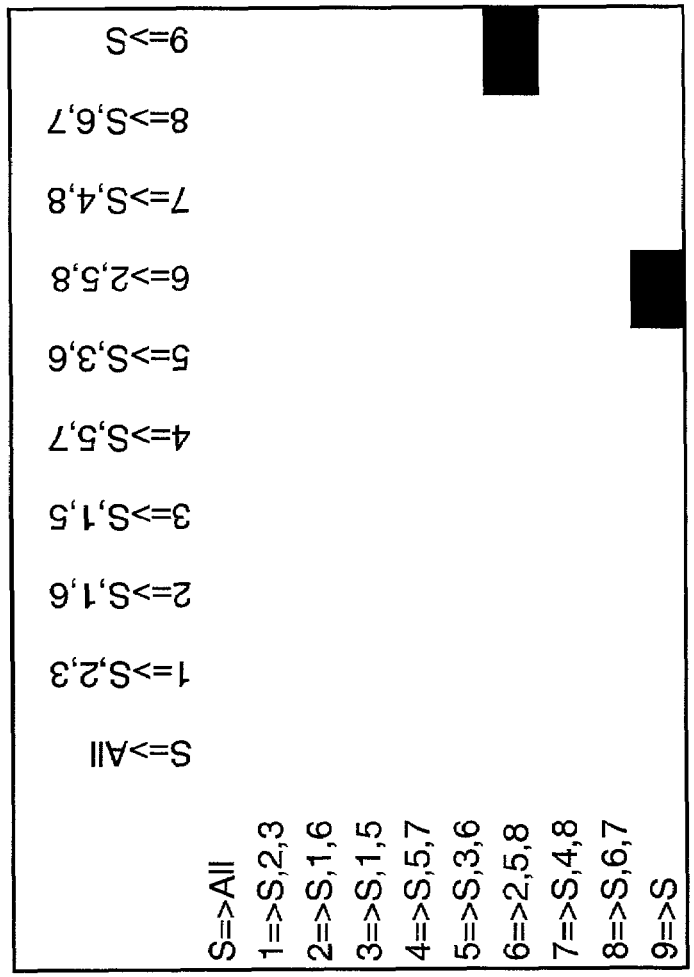
FIG. 18 illustrates a traffic matrix providing for multi-cache scheduling pursuant to operation of an embodiment of the present invention.
Figure 19:
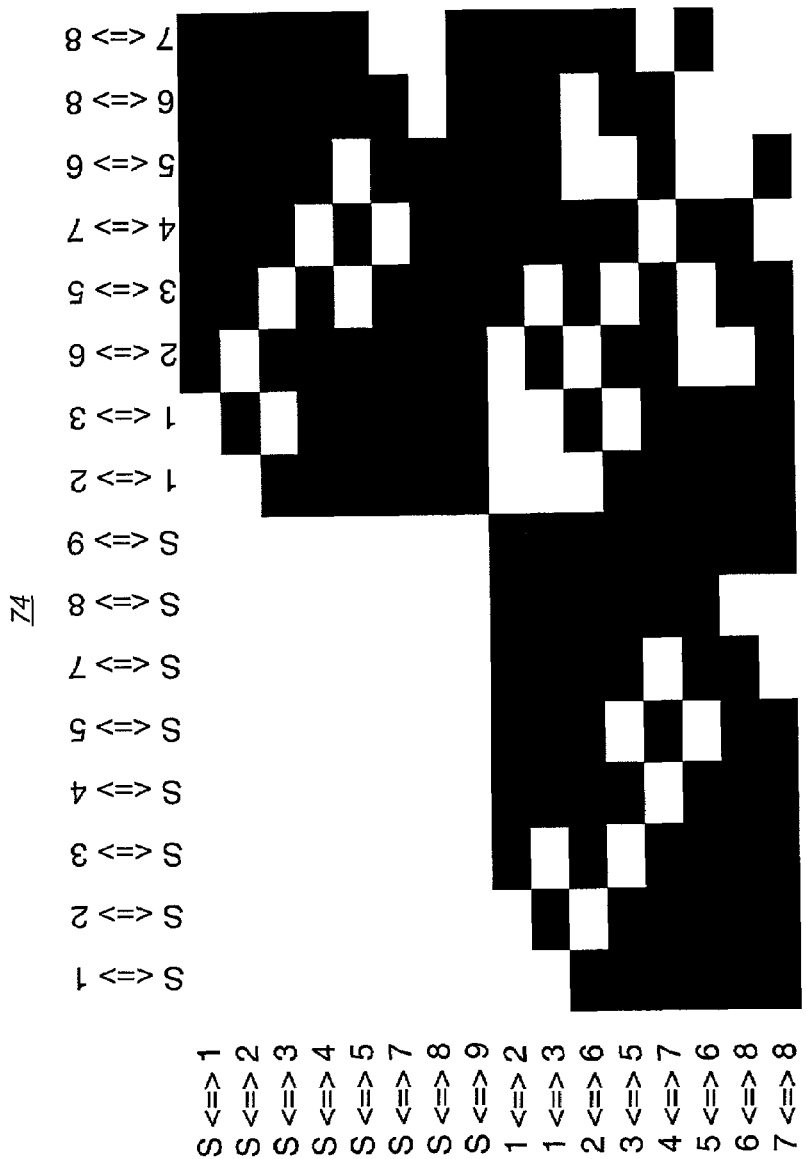
FIG. 19 illustrates a traffic matrix which provides for unicasting pursuant to operation of an embodiment of the present invention.

Each node (except the sink 14-S) has maximally three connections. A corresponding traffic matrix 72 for multicasting is illustrated in FIG. 18 whereas FIG. 19 shows a corresponding matrix 74 for uni-casting. These matrices are mainly generated for control slots, but can also be used with data slots.

The operation is mainly in PMP manner. The sink 14-S has an extended control slot or several control slots for its reservations. Then each node has its own control slot. Due to the topology the sink is forced to spend the whole control period either transmitting or receiving other nodes control packets. The nodes do only need to listen to the sink and to their connected neighbors. Thus, the nodes will automatically have idle slots during the control period.

Another restriction on the sink's scheduling is that none of the sectors may transmit while another is receiving, that is, all sectors must be either in transmission or reception mode simultaneously. This to avoid blocking of receiving sectors by transmitting sectors.

The mesh link layer introduced above can be deployed in the PMT case too. To fully exploit the benefits of a fixed configuration, improvements to the protocol are necessary.

When multi-casting from a node other than a sink is considered, there should be a fair amount of nodes more than one hop away from the sink, otherwise the PMT scheme will be as effective as the AMT. In the uni-cast mode, the PMT outperforms the AMT.

Figure 20:
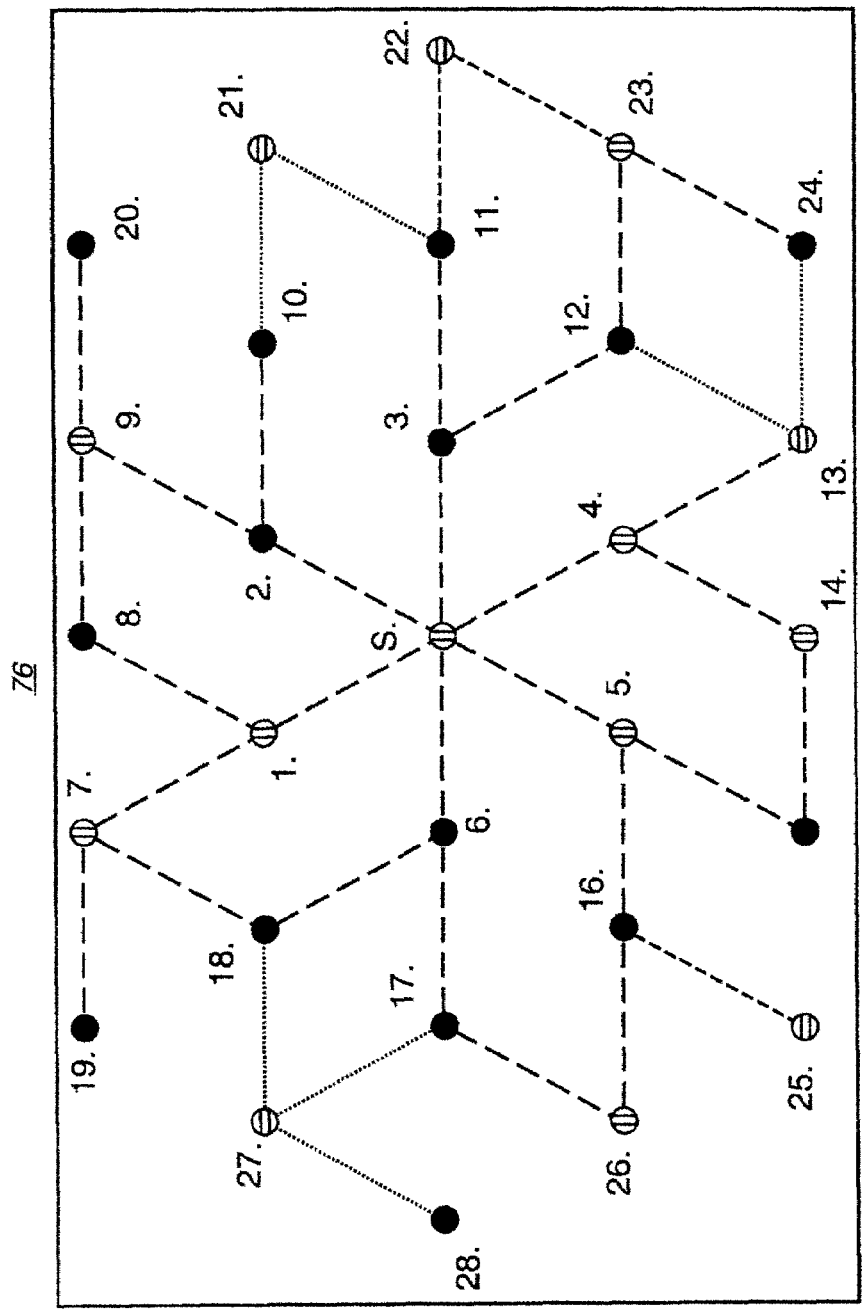
FIG. 20 illustrates an exemplary representation of another pre-configured mesh network formed pursuant to an embodiment of the present invention.

Referring now to FIG. 20, another example, shown generally at 76, of a pre-configured mesh network is illustrated. Here all the connections are handled in a PTP manner, meaning that a single node can transmit only over one of its connections. Each node has been assigned maximally three connections except for the sink 14-S, which has six connections. The example has only one sink incorporated.

Figure 21:
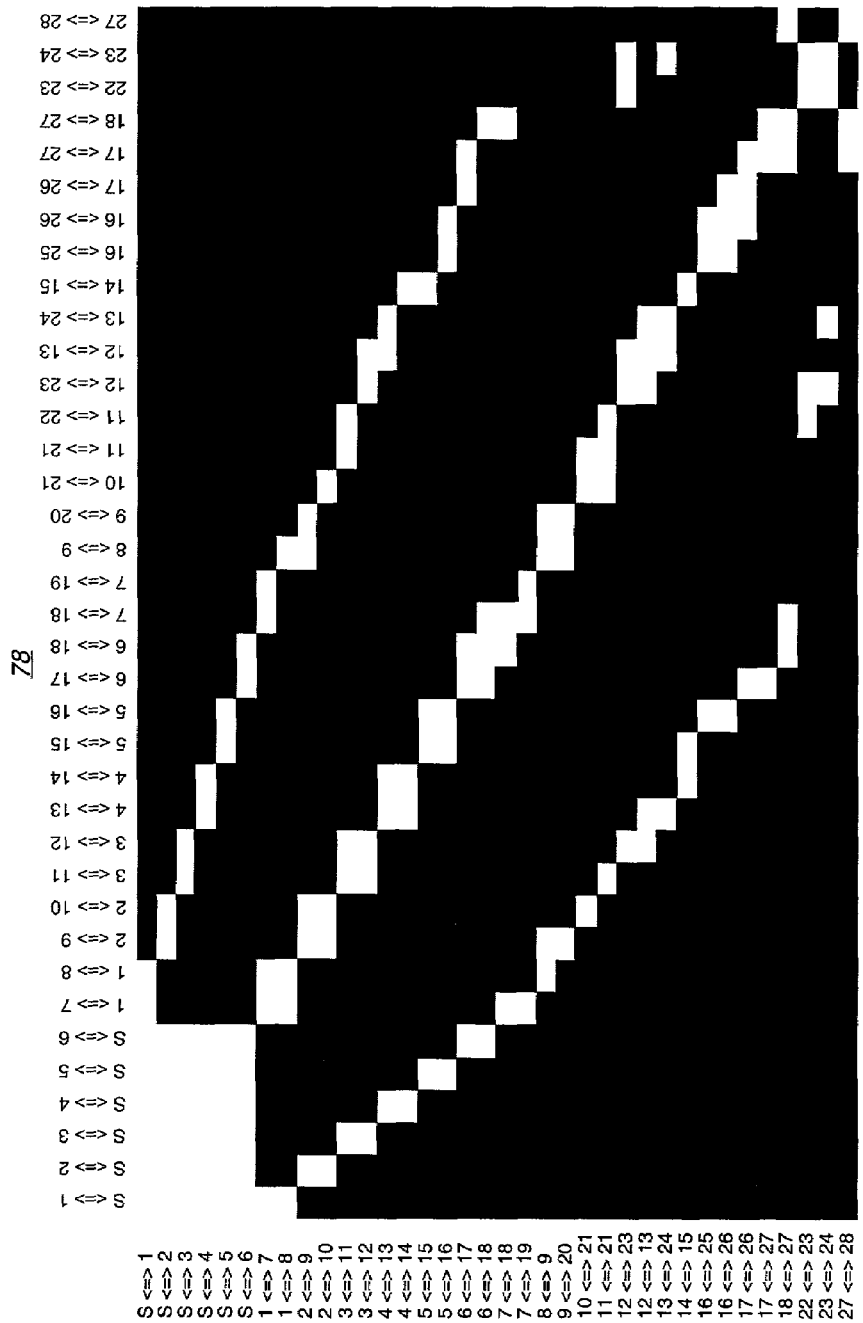
FIG. 21 illustrates a traffic matrix for the network shown in FIG. 20, herein which slots available for simultaneous transmission are indicated.

The corresponding traffic matrix, shown generally at 78, is shown in FIG. 21. Here the matrix is fully applicable both for control and data due to the single simultaneous connection approach. The black boxes denote empty slots. This example clearly shows that control slot scheduling is mandatory to cut the overhead.

The matrix also shows that even in a singular connection mode, the traffic to and from the sink does prevent others from using the same resource. Thus, it is proposed that the environment around the sink (nodes with direct connection to the sink) functions in a PMP fashion and the rest of the network in mesh fashion.

The division into control slots and data slots is similar to the AMT case. The length of the control period is defined by the maximum number of nodes supported in a sink's sector. If this number becomes very large, the AMT superframe structure can be deployed.

The sink is active during the whole control period. The other nodes do either stay on the same channel as the sink (transmitting to or receiving control slots from the sink) or use another channel for control packet exchange with another idle (in relation to a sink) neighbors. If empty slots still exist, then these slots can be successfully deployed for data transmission thus freeing up some space on the data channel.

Figure 22:
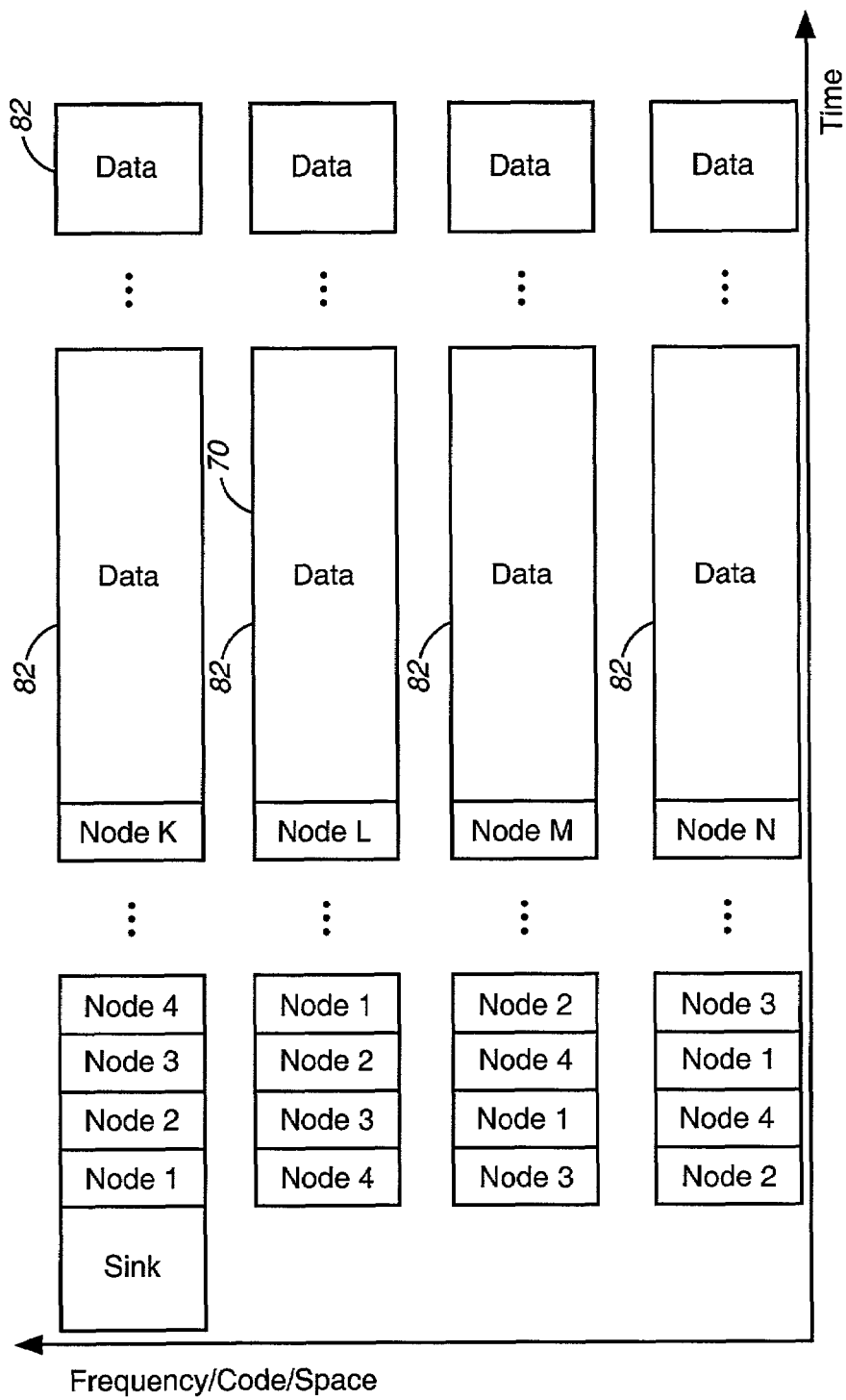
FIG. 22 illustrates the frame structure of the pre-configured mesh network shown in FIG. 20 of an embodiment of the present invention.

The frame structure showing frames 82 is depicted in FIG. 22.

The frame length is fixed. The ratio between the control and data period can be variable. The optimal length of the control period is the number of slots required for the communication with the sink, that is, a limited number of slots for the sink's control packets and one slot each for every node connected to the sink. Thus, the control period length is proportional to the number of connected nodes.

The variable period length is beneficial especially if the PMT is deployed in a PMP manner. In this case only one logical channel is needed to transport the control packets. For maximum channel usage data should be sent in every possible slot. In the PMT the number of nodes is known and thus the needed control period can be determined.

If a new device is brought into the system, the NMS is used to reserve an additional control slot for its usage. At setup the new device will find the empty slot and take it into use. This feature improves the authentication and security by not allowing an extra device to register for a control slot. The drawback is the increased installation labor compared to the self-configuring AMT.

The configuration is fixed and this enables both fixed control slots for each device as well as optimization of the slot usage. Control slot allocations can either be set by hand or calculated automatically in the NMS. The overhead of an AMT type MAC is suppressed but mesh topology is still supported.

Figure 23:
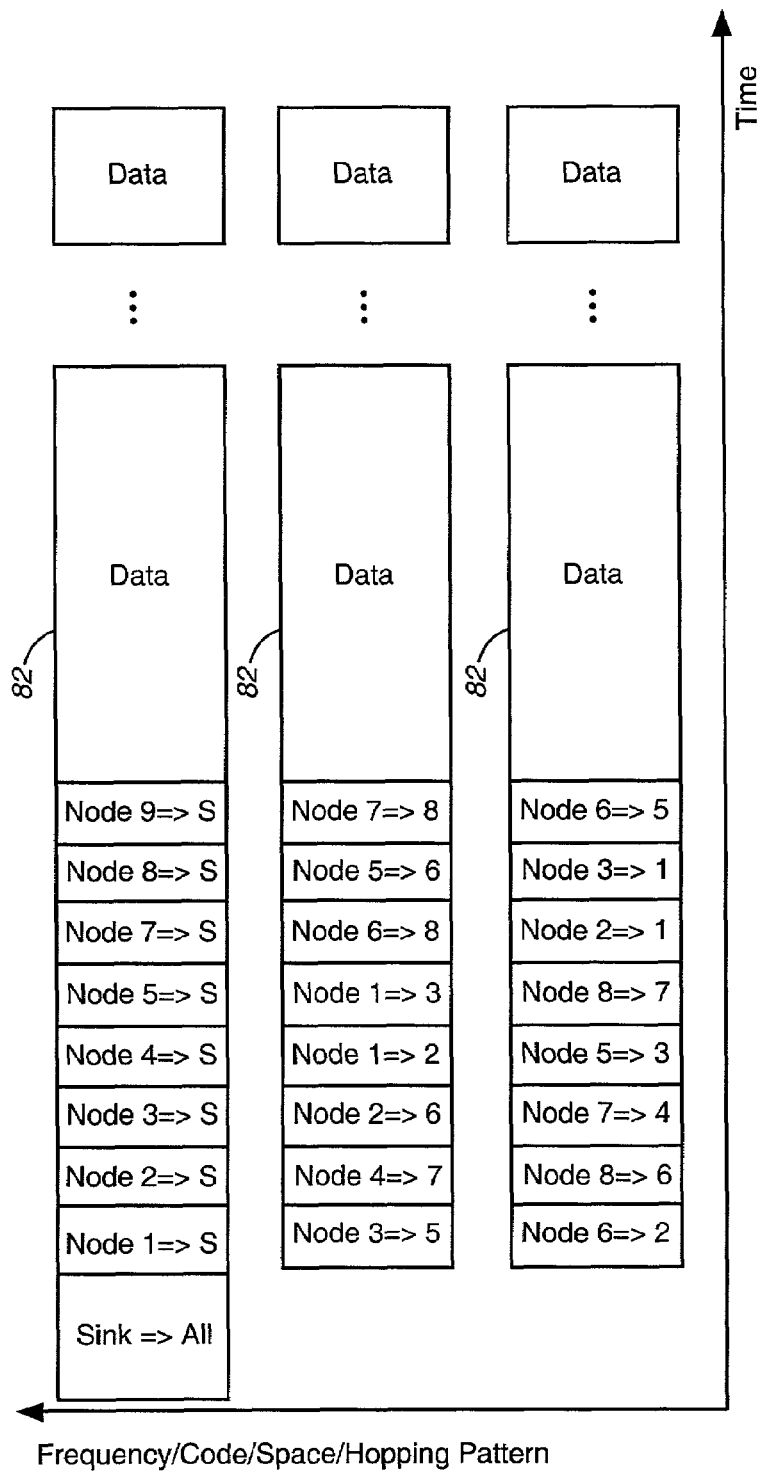
FIG. 23 illustrates an example of a control slot allocation for the configuration shown in FIG. 17.

FIG. 23 illustrates an example of a control slot allocation. The data frames 82 are again shown. It is assumed in the example, that the sink is only device able to multicast (transmit the same packet to several receivers simultaneously), all other nodes must choose their appropriate partner one at a time.

Three logical control channels are used in parallel. Compared to the AMT mesh approach within the same example network, the duration of the control period of the PMT solution is roughly one third of what it would have been for the AMT solution. The same amount of information (packets) is transported in both cases. The PMT solution requires more available channels. Narrowbeam antennas will partly solve this issue (space diversity).

FIG. 23 shows clearly the advantage of the proposed system compared to the AMT solution. It can be assumed that a sector could have up to 20-30 nodes connected to the sink. With a complex mesh structure the number of connections becomes high. For the AMT this would at least require the usage of superframes, e.g., see FIG. 14 thus increasing the start-up delay. Though the example in FIG. 23 does not include any data slots during the control period, it is fully possible to use empty slots for data thus improving the throughput performance further.

When the number of nodes reachable from a single node with a simultaneous transmission is larger than 3, the benefits of the PMT over AMT diminish and an AMT solution would be supported. Due to fairly similar basic approach in both cases, it can be feasible to support both AMT and PMT in a single device. The benefits are somewhat more flexibility and optimized performance at the cost of higher complexity.

Figure 24:
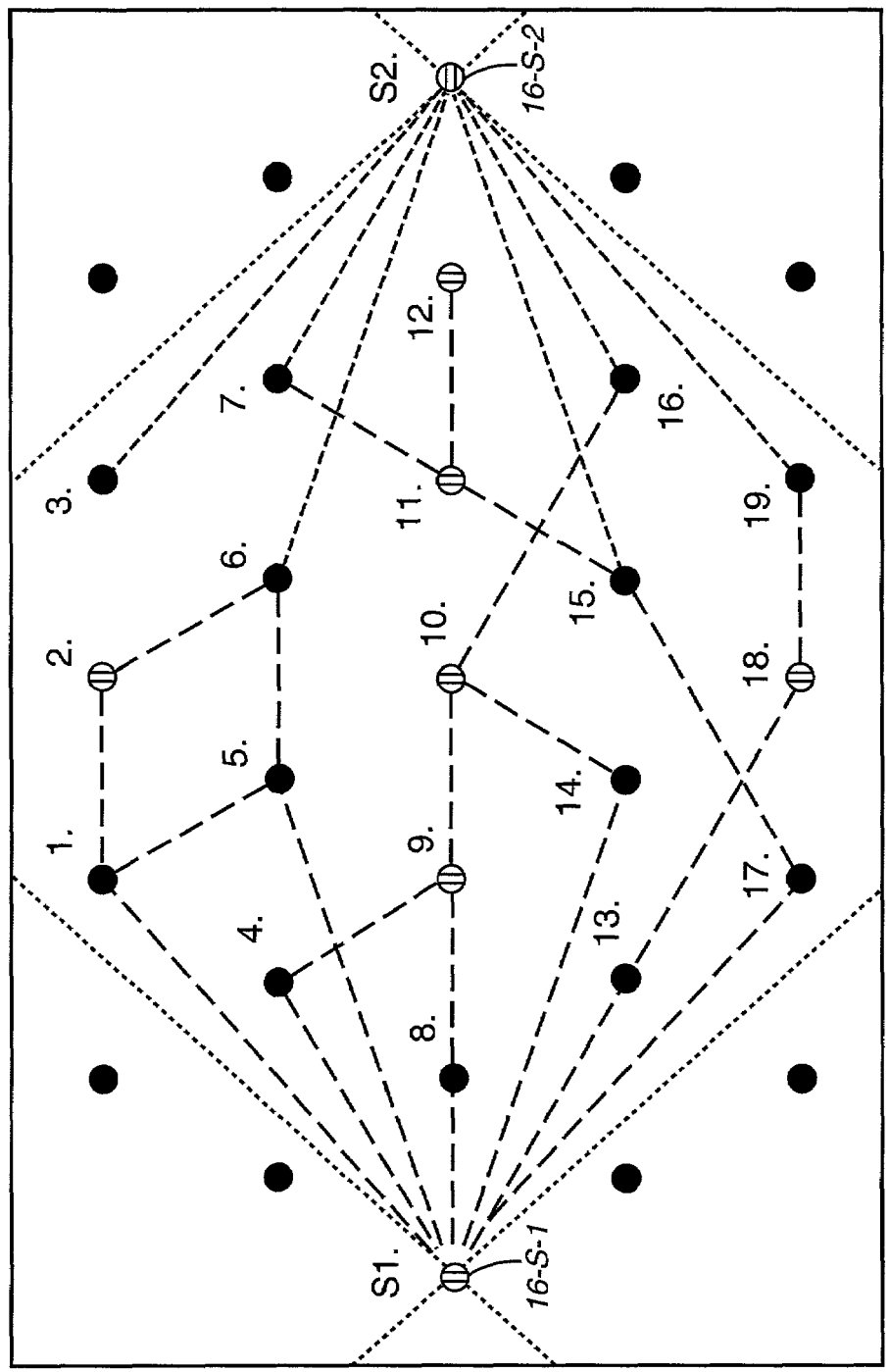
FIG. 24 illustrates a representation of a PMT (pre-configured mesh tier) network having two nodes forming sinks.
Figure 25:
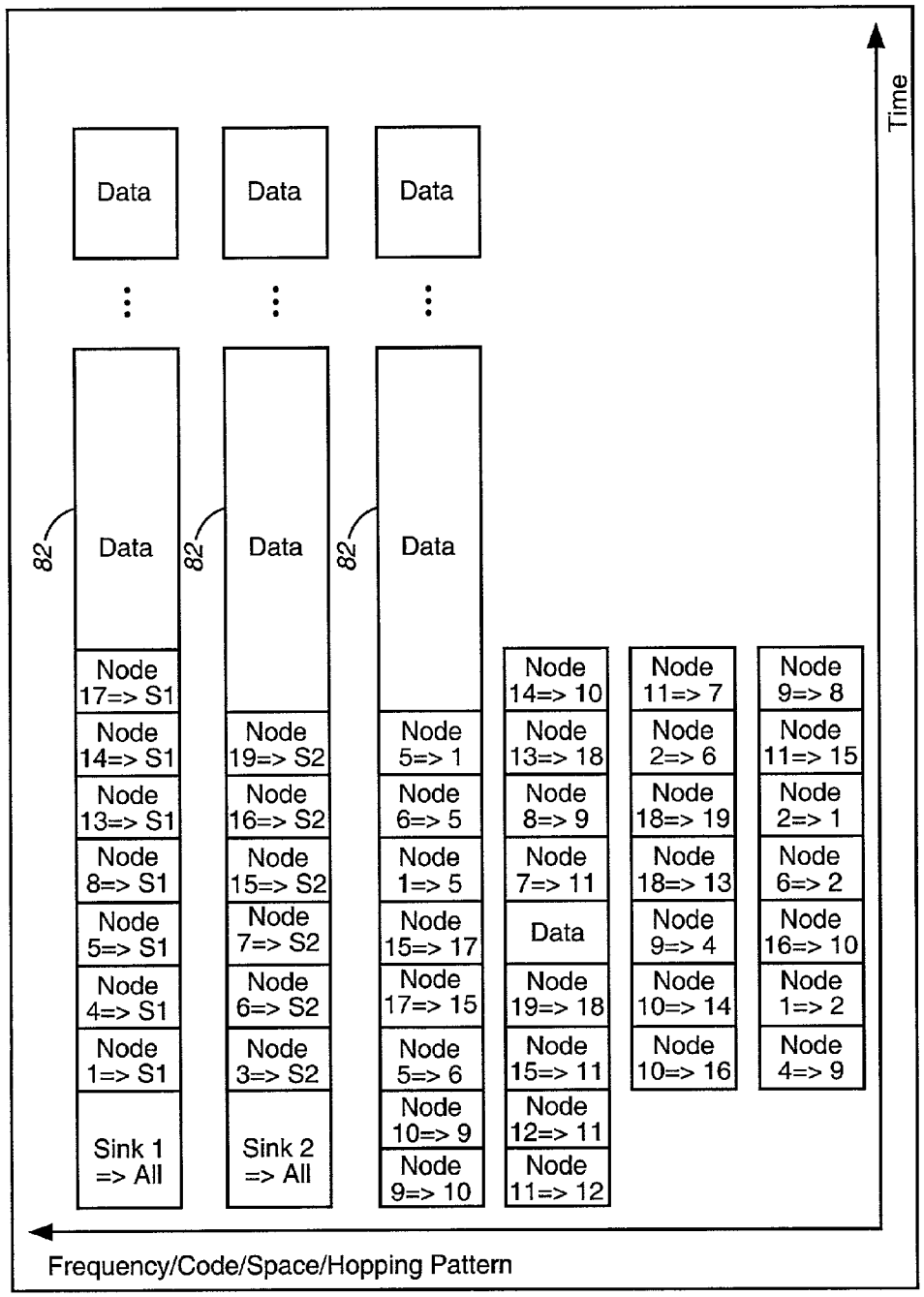
FIG. 25 illustrates the control slot and channel allocation for an implementation of the network shown in FIG. 24.

FIG. 24 illustrates a PMT network with two sinks 16-S-1 and 16-S-2. When narrowbeam antennas are considered for the nodes, FIG. 25 gives one possible example of control slot allocation. The data frames 82 are again shown in FIG. 25. It is essential to note that there are no nodes connected directly to both sinks 16-S-1 and 16-S-2 in the Figure, as this would prohibit sinks from transmitting their control-slots simultaneously, which would require additional protocol and device complexity compared and lead to negligible network benefits.

The control period in the frame depends on the needs of each sink separately. Hence, the control period may be different for different sinks and their surrounding nodes. Possibly empty control slots can be scheduled for data taking into account that these slots might not be available to all intended receivers.

Comparing FIG. 23 and FIG. 25, one can see, that adding two sinks into a network doubles the complexity compared to having only one sink. The merit of complexity is actually the number of connections between nodes. Considering nodes 9 and 10 in, it can be seen, that if the nodes of a link are one hop away from a sink, then they do not add to the complexity, but do not an give additional advantage over a PMP topology either. Thus, it is beneficial to maximize the number of intermediate nodes between sinks for the best performance. When the shortest path between sinks becomes long enough, there is not any need to align the control periods anymore (assuming the nodes in-between can be assigned the appropriate amount of control slots).

As a simplification, the scheduling problem can be split into two parts, the first being the time-scheduling, the second being the allocation of channels and/or (near)orthogonal hopping/spreading patterns taking the spatial diversity into consideration to suppress interference.

It should be noted that the scheduling complexity itself does not place a heavy constraint on the network, as all nodes are static. Scheduling optimization can hence be done off-line by the NMS at the time of introduction/removal of a node.

Fixed routing tables can be deployed for the PMT Tier due to the fixed network layout. Setting up a new device will automatically require an entry into the routing tables. If there is a malfunction or link failure, the routing can be performed using alternative routes stored into the routing table.

The PMT Tier resembles much to a fixed routing network and the same tools and techniques can be used successfully also here. For example fixed routing enables easier setup of VPNs and similar applications. Also load balancing can be easily supported.

Continuous link budget measurements will aid in real-time routing table updating if desired.

Routing and switching capabilities are required at every node. The routing tables can be "manually" set by the operator, or adaptively found as in the AMT. If an AMT sink is connected to the PMT node, the routing capabilities could be shared.

The PMT tier will support the same transport protocols as the AMT tier.

The aim of the network management in the PMT is to allow the network operator to change any desired parameter or protocol functionality in any remote device without any onsite maintenance. For this purpose, all devices must be SNMP-compatible, and allow the operator to ftp new software into the device.

For this tier, the network management must allow the operator to conveniently add nodes, without too many manual settings. Even though the network does not adapt itself to new nodes, the NMS must be capable of determining which parameters to change in the surrounding devices.

Network management for this tier will be part of the overall network management functionality.

The PMT tier is a more flexible and reliable innovation of what is known as LMDS (Local Multi-Point Distribution Service) today. The increased flexibility is the result of not requiring a direct link (direct or through a repeater) of each node to a sink. The increased reliability is the result of the link redundancy in a mesh topology. Another novelty lies in the combination of the PMT with the AMT. As the last mile access is handled with the AMT radios, which have cheaper RF technology and have no stringent LOS requirements, the PMT radios become less cost sensitive and the network easier to plan. This in turn enables fancier solutions than in pure LMDS systems, thus giving the PMT tier a performance and deployment advantage (i.e. higher range, throughput, interference resilience etc.) over LMDS solutions.

The purpose of the PTP Tier is to provide dedicated high capacity links. These are aimed as cable or fiber replacement when the link economics support it. The PTP radios might be a very attractive solution to operators not owning their own wired infrastructure or in cases where fast deployment is essential.

The PTP Tier throughput ranges from 155 Mbit/s and multiples of it to 1 Gbit/s. IR can be considered besides the traditional radio. Current regulation and implementation constraints limit the achievable range to below 500 m.

PTP Tier links are deployed one by one and it is suggested that licensed bands be used. The availability and reliability figures are equal to the wired backbones. This will dramatically increase the cost of the devices.

For example the Nokia PowerHopper (18 and 26 GHz) and Nera NL290 (4-13 GHz) radios could with some modifications and additions be successfully deployed on the PTP Tier.

The network management will facilitate the following aspects. First, The Configuration management: configuration management protocol will allow the operator to set such parameters as IP addresses, RX/TX parameters etc. Second, Fault management: The network fault management will allow the operator to access a device's error and warning logs, reset devices and shut down devices. The protocols will allow the operator to set various reporting levels and set the severity of errors to be reported to the central network management system. Third, Performance management: The performance management protocols in each device will monitor the device's link quality. Whether the device will report prolonged unacceptable link qualities to the operator's central management system will be configurable, as this feature is generally not desired for a AMT device, but very desirable for the PMT and PTP Tier devices. Fourth, Security management: The security management protocols will allow the operator to set keys in each device and to validate the key of each device. Each device must be able to validate access attempts. Fifth, Accounting management: The accounting management protocols will allow the operator to set the maximum throughput of traffic originating from the device. This would also include limiting the bursty throughput as well as the total traffic. Sixth: Flow management: The flow management allows the operator to force the direction of traffic, overruling the automatic routing protocols. Seventh, Upgrading management: The network will allow the operator to upgrade the software in one specific device by means of uni-cast, or in a group of devices by means of multi-cast.

All of the above features should be available to the operator from one single NMS, and should be accessible while the device is operational (with exception of certain upgrading and fault management functions, which may interrupt the device's operation for a short duration.

The present invention is a network that will be used for transportation of "internet applications", both the traditional flexible applications, such as ftp, web-browsing etc., and time-critical applications such as voice over IP, and audio/video streaming. This also includes applications, which require IPSEC security.

It will also be able to support multicast and broadcast applications.

As stated above, one of the many advantages of the system proposed herein lie in the flexibility of adaptation and deployment of the network, as well as in the plurality of services that a provider can offer to its customers and the range of devices that can be connected.

The fact that the proposed system provides a flexible wireless solution for traffic concentrations up to at least 155 Mbps, and the fact that the system reconfigures itself when new sinks are added, gives the service provider a flexible tool to match the bandwidth demands of its customers, and hence to scale up the network as desired. This in comparison to a wired solution, where the fixed capacity needs to be estimated years ahead, and can only be increased with significant investments.

The flexibility of adaptation and scalability also gives the provider rolling out the proposed network flexibility of deployment, since the provider can match his network to the current demand, and modify it easily and only when traffic-patterns change. This results in a much lower initial investment threshold for the provider compared to a wired solution, where the provider is more or less forced to deploy a full-scale network at once.

Due to the fact that the CPE devices are meant for short-distance (semi) LOS use, the cost of the RF part of a CPE can be kept fairly low. Also, since the basic access scheme is DSSS, but alternative high performance (and more expensive) schemes such as OFDM are optional, devices varying in performance and cost can be easily connected to the network, increasing the plurality of devices. On top of this, the AMT is intended for the ISM bands, for which the RF equipment is significantly cheaper than for the PMT devices, which may use the LMDS bands. Hence the hierarchical layering of the proposed system reduces costs compared to a pure LMDS-band based network.

The design of the system inherently allows the provider to offer its clients a wide variety of service packages. Not only because user priorities allow the provider to assign preferred customers and flexible maximum bandwidth, but also because the full system concept consists of three natural tiers of services. This allows the provider to not only have small-demand customers connect to the AMT, but also to have larger-demand customers connect to the PMT or even PTP tier, without changing the functionality of the system.

Due to the connection redundancy, the proposed network is more tolerant of link failure. When a link breaks, the device can reroute its traffic over its other links, in contrast to networks with such topologies as stars and trees. Even a sink-node failure will not result in loss of connectivity, as the traffic can (though with lower efficiency) be redirected to another sink-node.

Networks that rely on CSMA or similar contention-based access protocols tend to break down or deliver drastically lower throughput as the number of active devices grows large. This is due to the increased probability of collisions and the back-off mechanisms. The proposed network however does not suffer from such effects as reservation mechanisms are used. Even when the number of devices grows large compared to the number of control-slots available in a superframe, redefinition of the superframe size will easily allow for more control-slots and hence facilitate access for more devices. On the other hand, when few devices are present, the superframe can be defined smaller, such as not to waste resources.

Reliability is further provided by the modulation agility, which allows a device to switch to modulations less sensitive to interference if necessary, while it enables selecting high throughput modulations when the link-quality is sufficient.

Additional reliability may be provided by using the FFT engine (necessary for OFDM implementation) for spectral analysis to detect and avoid channels with high interference.

The main alternative solution to the wireless access provision detailed in this document is the fully wired connectivity concept as is currently being deployed with low speed telephone modems, DSL technologies, ISDN, cable modems, fiber etc.

The advantage the proposed solution has over low speed telephone modems clearly lies in the offered throughput. With current (non-DSL) technology, the maximum available throughput is 56kbps. Another advantage is that the proposed solution is "always on", whereas telephone modems are dia-lup devices.

The advantage the proposed wireless solution has over existing DSL technologies, is that the system concept is designed such as to guarantee a minimum throughput at all times, while DSL throughput is often degraded due to insufficient backhaul capacity and excessive traffic bundling. Also, the proposed solution is designed to be capable of providing access in any scenario, whereas DSL is often limited to urban scenarios due to the strict distance limitations.

The advantage of the proposed wireless solution over cable modems lies mainly in the excessive wiring costs required to provide cable modems. On top of that, wired solutions need to be fully deployed before any service can be offered, which requires a huge investment. The proposed wireless solution is scalable and can be tailored to the short-term demand and expanded with low cost when necessary.

For fiber networks, the same holds as for cable modems.

Wireless Solutions

Competing wireless solutions are satellite systems, WLL, advanced cellular networks, WLAN and LMDS based solutions.

For satellite systems, two configurations are in use, one using both uplink and downlink through the satellite, while the other uses the satellite only for downlink. The clear disadvantage of both these configurations is the huge deployment cost. Another drawback is the high delay and the limited available throughput. The advantage of the system of an embodiment of the present invention is good coverage.

WLL solutions are mainly intended for wireline replacement thus providing suitable bitrates for speech. This is a clear disadvantage compared to the proposed system, though the most advanced WLL systems try to achieve higher bitrates.

Cellular networks provide mobility with a low throughput. The deployment costs are higher than for the proposed system. Operation of the cellular networks is licensed and highly regulated, thus limiting the business to just a few operators per area.

WLAN support is partly included in the proposed system. A plain WLAN system has the limitations of a very small cell size thus requiring a huge amount of base stations for building coverage. The base station deployment is costly due to the fact that every base station must be connected to the wired network, thus requiring costly new wiring. This problem can be solved with the proposed inband transmission (AMT).

Another one tier wireless solution is a fully PMP (LMDS) network. The main advantage the proposed network has over this solution, is that it does not suffer from the stringent LOS requirements of this type of solution, and that the CPE devices for low-demand customer premises will be far less expensive due to the lower cost of the RF part.

What is claimed:

1. A system comprising:
a first-tier mesh, a second-tier mesh, and a third-tier mesh, wherein the first-tier mesh, the second-tier-mesh, and the third-tier mesh operate and communicate according to different mesh architectures based on at least two of a point-to-point-mesh architecture, a pre-configured-mesh architecture, and an ad-hoc-mesh architecture, the first-tier mesh, the second-tier mesh, and the third-tier mesh configured as separate networks;

wherein the first-tier mesh formed of a plurality of first-tier nodes, each of the first-tier nodes of the plurality of first-tier nodes configured to communicate data within the first tier with at least selected others of the first-tier nodes, at least one of the first-tier nodes forming a first-tier sink node configured to communicate via the second-tier mesh, wherein the at least a second-tier mesh formed of a plurality of second-tier nodes, each of the second-tier nodes of the plurality of second-tier nodes configured to communicate data within the second tier with at least selected others of the second-tier nodes, at least one of the second-tier nodes forming a second-tier sink node, the second-tier sink node further configured to communicate with the first-tier sink node of said first-tier mesh and configured to communicate via the third-tier, wherein the third-tier mesh formed of a plurality of third-tier nodes, each of the third-tier nodes of the plurality of third-tier nodes configured to communicate data with at least selected others of the third-tier nodes and at least one of the second-tier mesh and the third-tier mesh, at least one of the third-tier nodes forming a third-tier sink node, wherein the system is configured to provide radio communication of data therein, and the first-tier nodes of said first-tier mesh operate and communicate based on first-tier-mesh operational characteristics, wherein the second-tier nodes of said second-tier mesh operate and communicate based on second-tier-mesh operational characteristics, and wherein the third-tier nodes of said third-tier mesh operate and communicate based on third-tier-mesh operational characteristics, and wherein each of the first-tier mesh, the second-tier mesh, and the third-tier mesh includes at least one sink node to provide communications among the first-tier mesh, the second-tier mesh, and the third-tier mesh.

2. The system of claim 1, wherein the first-tier-mesh operation characteristic comprise a first frequency band within which communication of data is effectuated, wherein the second-tier-mesh operation characteristics comprise a second frequency bandwidth within which communication of data is effectuated, the first frequency bandwidth and the second frequency bandwidth having at least plurality nonoverlapping portions.

3. The system of claim 1, wherein at least one first-tier node of said first-tier mesh and at least one second tier node of said second-tier mesh are co-located, the at least one first-tier node co-located with the at least one second-tier node configured to communicate with the at least selected others of the first-tier-nodes and at least one second-tier node co-located with the at least one first-tier node configured to communicate with at least selected other second-tier nodes.

4. The system of claim 1, wherein the first-tier nodes comprise mobile nodes configured to move throughout a selected area.

5. The system of claim 1, wherein communication of data is effectuated pursuant to non line of sight communication techniques.

6. The system of claim 1, wherein the second-tier nodes are stationary.

7. The system of claim 6, wherein communication of data is effectuated pursuant to line of sight communication techniques.

8. The system of claim 1, wherein at least one first-tier node of said first-tier mesh and at least one second tier node of said second-tier mesh are not co-located, the at least one first-tier node located distant from the at least one second-tier node configured to communicate with the at least selected others of the first-tier-nodes and the at least one second-tier node located distant from the at least one first-tier node configured to communicate with the at least selected others of the second-tier nodes.

9. The system of claim 1, wherein the first-tier mesh comprises an ad-hoc mesh which exhibits an ad-hoc configuration and an ad-hoc number of the at least one first-tier node.

10. A system comprising:
a first-tier mesh formed of a plurality of first-tier nodes, each of the first-tier nodes of the plurality of first-tier nodes configured to communicate data within the first tier with at least selected others of the first-tier nodes, at least one of the first-tier nodes forming a first-tier sink node;
at least a second-tier mesh formed of a plurality of second-tier nodes, each of the second-tier nodes of the plurality of second-tier nodes configured to communicate data within the second tier with at least selected others of the second-tier nodes, at least one of the second-tier nodes forming a second-tier sink node, the second-tier sink node further configured to communicate with the first-tier sink node of said first-tier mesh and a third-tier mesh separate from the first-tier mesh and the second-tier mesh; and
wherein the third-tier mesh formed of a plurality of third-tier nodes, each of the third-tier nodes of the plurality of third-tier nodes configured to communicate data with at least selected others of the third-tier nodes, at least one of the third-tier nodes forming a third-tier sink node,
wherein the system is configured to provide radio communication of data therein and the first-tier nodes of said first-tier mesh operate and communicate based on first-tier-mesh operational characteristics, and wherein the second-tier nodes of said second-tier mesh operate and communicate based on second-tier-mesh operational characteristics, first-tier-mesh operational topological characteristics and second-tier-mesh operational topological characteristics being different, wherein the first-tier mesh and the second-tier mesh operate and communicate according to different mesh architectures based on at least one of a point-to-point-mesh architecture, a pre-configured-mesh architecture and an ad-hoc-mesh architectures, and wherein each of the first-tier mesh, the second-tier mesh, and the third-tier mesh includes at least one sink node to provide communications among the first-tier mesh, the second-tier mesh, and the third-tier mesh.

11. The system of claim 10, wherein the first-tier nodes of said first-tier mesh operate and communicate based on first-tier mesh operational characteristics wherein the second-tier nodes of said second-tier mesh are operational pursuant to second-tier-mesh operational characteristics, and wherein the their-tier nodes of said third-tier mesh are operational pursuant to third-tier-mesh operational characteristics, the first-tier, second-tier, and third-tier mesh operational characteristics, respectively, being in some part dissimilar.

12. The system of claim 10, wherein said third-tier mesh comprises a point-to-point mesh which exhibits a fixed configuration and a fixed number of third-tier nodes.

13. The system of claim 12, wherein communication of data between the third-tier nodes is effectuated pursuant to line of sight communication techniques.

14. The system of claim 10, further comprising an other of the second-tier nodes of said second-tier mesh positioned between the first second-tier sink node and the second second-tier sink node, communications between the first and second second-tier sink nodes effectuated by way of the other of the second-tier nodes.

15. The system of claim 10, wherein data communicated between the first-tier nodes of said first-tier mesh is communicated at a first data rate, wherein data communicated between the second tier nodes of said second-tier mesh is communicated at a second data rate, the second data rate greater than the first data rate such that data communicated between the first and second first-tier sink nodes is communicated more quickly by way of the first and second second-tier sink nodes than by way of the first-tier nodes of said first-tier mesh.

16. A method performed by a device comprising: the device forming a wireless access network providing for communication therein, the device forming a first-tier mesh of a plurality of first tier nodes, each of the first tier nodes configured to communicate data within the first tier with at least selected others of the first-tier nodes, at least one of the first-tier nodes forming a first-tier sink node;
forming a second-tier mesh of a plurality of second-tier nodes, each of the second-tier nodes of the plurality of second-tier nodes configured to communicate data within the second tier with at least selected others of the second-tier nodes, at least one of the second tier nodes forming a second-tier sink node further configured to communicate with the first-tier sink node of the first-tier mesh formed during said operation of forming the second-tier mesh and with a point-to-point mesh separate from the first-tier mesh and the second-tier mesh; and
forming a third-tier mesh of a plurality of third-tier nodes, each of the third-tier nodes of the plurality of third-tier nodes configured to communicate data within the third-tier with at least selected others of the third-tier nodes, at least one of the third-tier nodes forming a third-tier sink node further configured to communicate with at least one of the first-tier sink node and the second-tier sink node; and
wherein each of the first-tier mesh, the second-tier mesh, and the third-tier mesh includes at least one sink node to provide communications among the first-tier mesh, the second-tier mesh, and the third-tier mesh.

17. The method of claim 16, wherein the first-tier-mesh operation characteristic comprise a first frequency band within which communication of data is effectuated, wherein the second-tier-mesh operation characteristics comprise a second frequency bandwidth within which communication of data is effectuated, the first frequency bandwidth and the second frequency bandwidth having at least plurality non-overlapping portions.

18. The method of claim 16, wherein at least one first-tier node of said first-tier mesh and at least one second tier node of said second-tier mesh are co-located, the at least one first-tier node co-located with the at least one second-tier node configured to communicate with the at least selected others of the first-tier-nodes and at least one second-tier node co-located with the at least one first-tier node configured to communicate with at least selected other second-tier nodes.

19. The method of claim 16, wherein the first-tier nodes comprise mobile nodes configured to move throughout a selected area.

20. The method of claim 16, wherein communication of data is effectuated pursuant to non line of sight communication techniques.

* * * * *

UNITED STATES PATENT AND TRADEMARK OFFICE
CERTIFICATE OF CORRECTION

PATENT NO. : 7,653,030 B2  Page 1 of 1
APPLICATION NO. : 09/833868
DATED : January 26, 2010
INVENTOR(S) : Arrakoski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1837 days.

Signed and Sealed this

Twenty-eighth Day of December, 2010

David J. Kappos
*Director of the United States Patent and Trademark Office*